US012711299B2

(12) United States Patent
Egan et al.

(10) Patent No.: US 12,711,299 B2
(45) Date of Patent: Aug. 18, 2026

(54) SYSTEMS AND METHODS FOR DETERMINING SPECIFICATION LIMITS IN A SEMICONDUCTOR DEVICE VIRTUAL FABRICATION ENVIRONMENT

(71) Applicant: Coventor, Inc., Cary, NC (US)

(72) Inventors: William J. Egan, Framingham, MA (US); Anshuman Kunwar, Jamaica Plain, MA (US); Kenneth Greiner, Arlington, MA (US); David M. Fried, Monte Sereno, CA (US)

(73) Assignee: Coventor, Inc., Cary, NC (US)

(*) Notice: Subject to any disclaimer, the term of this patent is extended or adjusted under 35 U.S.C. 154(b) by 796 days.

(21) Appl. No.: 18/015,855

(22) PCT Filed: Jul. 14, 2021

(86) PCT No.: PCT/US2021/041700

§ 371 (c)(1),
(2) Date: Jan. 12, 2023

(87) PCT Pub. No.: WO2022/015897

PCT Pub. Date: Jan. 20, 2022

(65) Prior Publication Data

US 2023/0252211 A1 Aug. 10, 2023

Related U.S. Application Data

(60) Provisional application No. 63/053,052, filed on Jul. 17, 2020.

(51) Int. Cl.
*G06F 30/398* (2020.01)
*G03F 7/00* (2006.01)
(Continued)

(52) U.S. Cl.
CPC ........... *G06F 30/398* (2020.01); *G03F 7/705* (2013.01); *G03F 7/70616* (2013.01);
(Continued)

(58) Field of Classification Search
None
See application file for complete search history.

(56) References Cited

U.S. PATENT DOCUMENTS 5,416,729 A 5/1995 Leon et al.
5,473,710 A 12/1995 Jaw et al.
(Continued)

FOREIGN PATENT DOCUMENTS

CN 103823917 A 5/2014
CN 103970954 A 8/2014
(Continued)

OTHER PUBLICATIONS

Ahn Nguyen Duc, "Are 200 replicates per scenario enough for a simulation study?", ResearchGate, Jun. 4, 2014, 3 pages, retrieved on Dec. 6, 2024, from: https://www.researchgate.net/post/Are-200-replicates-per-scenario-enough-for-a-simulation-study.
(Continued)

*Primary Examiner* — Leigh M Garbowski
(74) *Attorney, Agent, or Firm* — Weaver Austin Villeneuve & Sampson LLP

(57) ABSTRACT

A virtual fabrication environment for semiconductor device fabrication that includes an analytics module for determining specification limits using a fitting algorithm for non-normally distributed virtual metrology data is discussed.

25 Claims, 21 Drawing Sheets

(51) Int. Cl.
*G06F 7/00* (2006.01)
*G06F 30/30* (2020.01)
*G06F 30/3308* (2020.01)
*G06F 119/18* (2020.01)

(52) U.S. Cl.
CPC .... *G03F 7/706835* (2023.05); *G06F 30/3308* (2020.01); *G06F 2119/18* (2020.01)

(56) References Cited

U.S. PATENT DOCUMENTS 6,116,766 A 9/2000 Maseeh et al.
6,671,661 B1 * 12/2003 Bishop ................ G06F 18/2135 703/2
7,492,364 B2 2/2009 Devarajan et al.
7,526,739 B2 4/2009 McIlrath
8,032,857 B2 10/2011 McIlrath
8,209,649 B2 6/2012 McIlrath
8,266,560 B2 9/2012 McIlrath
8,285,412 B2 10/2012 Kyoh
8,606,774 B1 12/2013 Makadia et al.
8,691,599 B2 4/2014 Guo et al.
8,832,620 B1 9/2014 Fried et al.
8,959,464 B2 2/2015 Greiner et al.
9,317,632 B2 4/2016 Faken et al.
9,965,577 B2 5/2018 Kamon et al.
10,242,142 B2 3/2019 Greiner et al.
11,144,701 B2 10/2021 Egan et al.
11,860,548 B2 * 1/2024 Tel .......................... G03F 7/705
11,861,289 B2 1/2024 Egan et al.
12,423,486 B2 9/2025 Egan et al.
12,475,297 B2 11/2025 Egan et al.
2002/0037596 A1 3/2002 Yamaguchi
2005/0076316 A1 4/2005 Pierrat et al.
2005/0198602 A1 9/2005 Brankner
2005/0240895 A1 10/2005 Smith et al.
2006/0054088 A1 3/2006 Jagawa et al.
2007/0013398 A1 1/2007 Rathei
2007/0031745 A1 2/2007 Ye et al.
2007/0035716 A1 2/2007 Yoshii et al.
2007/0100487 A1 5/2007 Cheng et al.
2007/0118349 A1 5/2007 Jakatdar et al.
2007/0198114 A1 8/2007 Hashima et al.
2008/0058978 A1 3/2008 Cain et al.
2008/0104562 A1 5/2008 Ichinose
2009/0006039 A1 1/2009 Watanabe
2009/0024377 A1 1/2009 Min
2009/0055789 A1 2/2009 McIlrath
2009/0064058 A1 3/2009 McIlrath
2009/0144042 A1 6/2009 Lorenz et al.
2009/0249263 A1 10/2009 Arimoto
2010/0005437 A1 1/2010 McIlrath
2010/0180241 A1 7/2010 Asai
2011/0138343 A1 6/2011 Granik
2011/0153271 A1 6/2011 Tiwary et al.
2011/0185323 A1 7/2011 Hogan et al.
2011/0289472 A1 11/2011 Finkler et al.
2011/0314437 A1 12/2011 McIlrath
2012/0119096 A1 5/2012 Vija et al.
2012/0129301 A1 5/2012 Or-Bach et al.
2012/0239178 A1 9/2012 Wu et al.
2012/0248595 A1 10/2012 Or-Bach et al.
2012/0264237 A1 10/2012 Shearn et al.
2012/0264514 A1 10/2012 Lee et al.
2012/0317528 A1 12/2012 McIlrath
2013/0130498 A1 5/2013 Feustel et al.
2013/0275937 A1 10/2013 Joshi et al.
2013/0339918 A1 12/2013 Clark
2014/0278266 A1 9/2014 Faken et al.
2014/0282324 A1 9/2014 Greiner et al.
2014/0282328 A1 9/2014 Fried et al.
2015/0195091 A1 7/2015 Kubota et al.
2017/0039308 A1 2/2017 Moroz et al.
2018/0095936 A1 4/2018 Bonnecaze et al.
2018/0365370 A1 12/2018 Egan et al.
2019/0065630 A1 2/2019 Kim et al.
2019/0163075 A1 5/2019 Theeuwes et al.
2019/0286780 A1 9/2019 Greiner et al.
2020/0356711 A1 11/2020 Egan et al.
2021/0082399 A1 3/2021 Kurata et al.
2022/0019724 A1 1/2022 Egan et al.
2022/0198333 A1 6/2022 Pack et al.
2023/0080235 A1 3/2023 Gil Ramos et al.
2024/0070373 A1 2/2024 Egan et al.

FOREIGN PATENT DOCUMENTS

CN 105830069 A 8/2016
CN 109145354 A 1/2019
CN 110555566 A 12/2019
GB 2482076 A 1/2012
JP H0536832 A 2/1993
JP H07115071 A 5/1995
JP 8-107050 A 4/1996
JP 2002305253 A 10/2002
JP 2003324041 A 11/2003
JP 2003345854 A 12/2003
JP 2005019524 A 1/2005
JP 2006178907 A 7/2006
JP 2006268558 A 10/2006
JP 2007507889 A 3/2007
JP 2007535135 A 11/2007
JP 2008034714 A 2/2008
JP 2011082562 A 4/2011
JP 2011113291 A 6/2011
JP 2016004421 A 1/2016
JP 2016512641 A 4/2016
JP 2017037441 A 2/2017
JP 2017090947 A 5/2017
JP 2021504743 A 2/2021
KR 20160110116 A 9/2016
KR 20180137430 A 12/2018
KR 20220125208 A 9/2022
TW 200849052 A 12/2008
TW 200912888 A 3/2009
TW I342469 B 5/2011
TW 201500949 A 1/2015
TW 201500950 A 1/2015
TW 201539226 A 10/2015
TW I624764 B 5/2018
TW 201913849 A 4/2019
WO WO-2011078930 A1 6/2011
WO WO-2015112979 A1 7/2015
WO WO-2022015897 A1 1/2022

OTHER PUBLICATIONS

AP Statistics., "Cumulative AP Exam Study Guide," ilearnacademy.net stat review notes, 2017, pp. 1-8.
Autoform_2019., Sensitivity Analysis downloaded from Web.archive.org dated Apr. 3, 2019, 1 page.
Clark et al., "A million wafer, virtual fabrication approach to determine process capability requirements for an industry-standard 5nm BEOL two-level metal flow," Simulation of Semiconductor Processes and Devices, IEEE, 2016, pp. 43-46.
CN Office Action dated May 12, 2024 in CN Application No. 201810629679.9 with English translation.
"Completion Rate," Science Direct, 2018, pp. 1-8.
Conover W J., "Practical Nonparametric Statistics," Third Edition. John Wiley & Sons, Inc., New York, 1999, pp. 442-447.
Czitrom, "One-factor-at-a-time versus designed experiments," The American Statistician. May 1, 1999, vol. 53(2), pp. 126-131.
Davies R H., et al., "Building 3-D statistical Shape Models by Direct Optimization," IEEE Transactions on Medical Imaging, vol. 29(4), Apr. 2010, pp. 961-981.
ECE723_Lec5_2014., Lecture 5: Lithography MAPUA Institute of Technology, 2014, pp. 1-33.
Egan J W et al., "Measurement of Carboxyhemoglobin in Forensic Blood Samples Using UV-Visible Spectrometry and Improved Principal Component Regression," Applied Spectroscopy. Feb. 1, 1999 vol. 53(2), pp. 218-225.

(56) References Cited

OTHER PUBLICATIONS

Fisher, "Design of Experiments," Hafner Publishing Company, New York. p. 94, (1971).
Genesys 2009.04 User Guide: Yield/Monte Carlo, 2010, pp. 1-14.
Greenwood et al., "Sample size required for estimating the standard deviation as a per cent of its true value," Journal of the American Statistical Association, Jun. 1, 1950 vol. 45(250), pp. 257-260.
Guler, S et al., "Bayesian Optimization for Tuning Lithography Processes," IFAC—PapersOnLine, 2021, vol. 54(7), pp. 827-832.
International Preliminary Report on Patentability and Written Opinion dated Jan. 26, 2023 in PCT Application No. PCT/US2021/041700.
International Search Report and Written Opinion dated Jan. 23, 2024 in PCT Application No. PCT/US2023/033955.
International Search Report and Written Opinion dated Oct. 27, 2021 in PCT Application No. PCT/US2021/041700.
JMP, Design of Experiments Guide, Version 13. JMP Statistical Discovery From SAS. 708 pages, Sep. 2016.
Jones et al., "Definitive screening designs with added two-level categorical factors," Journal of Quality Technology, Apr. 1, 2013, vol. 45(2), pp. 121-129.
Jones et al., "A class of three-level designs for definitive screening in the presence of second-order effects," Journal of quality Technology, Jan. 1, 2011, vol. 43(1), pp. 1-5.
JP Office Action dated Mar. 22, 2023, in application No. JP 2022-103142 with English translation.
JP Office Action dated May 21, 2024 in JP Application No. 2023-066796 with English translation.
JP Office Action dated May 31, 2022, in application No. JP 2018-115285 with English translation.
JP Office Action dated Nov. 5, 2024 in JP Application No. 2023-066796, with English Translation.
Kagaiwalla et al., "Design-Aware Mask Inspection," IEEE/ACM International Conference on Computer-Aided Design, 2010, vol. 31(5), pp. 1-8.
Koehler, E., et al., "On the Assessment of Monte Carlo Error in Simulation-based Statistical Analyses," The American Statistician, 2009, vol. 63(2), pp. 155-162.
KR Office Action dated Dec. 5, 2024 in KR Application No. 10-2024-0052031, with English Translation.
KR Office Action dated Mar. 14, 2023, in application No. KR 10-2018-0069418 with English translation.
KR Office Action dated Sep. 14, 2022, in application No. KR 10-2018-0069418 with English translation.
Martinez et al., "Computational Statistics Handbook with MATLAB, Second Edition, Computer Science and Data Analysis Series," Chapman & Hall/CRC, Taylor & Francis Group, Boca Raton, 2008, pp. 126-132.
Miller., "Statistical Design and Opt for Amplifiers," Amplifier Design Guide, Sep. 10, 2008, pp. 1-11.
Miller., "Using Statistical Design," Optimization and Statistical Design , May 27, 2014, pp. 1-31.
Montgomery, "Design and Analysis of Experiments," Eighth Edition, John Wiley & Sons, Inc. 2013, pp. 11-21, 183-189.
Neter et al., "Applied Linear Statistical Models," Fourth Edition. Irwin, Chicago. 1996, pp. 288-295, 347-352.
Rasmussen et al., "Gaussian Processes for Machine Learning," The MIT Press, www.GaussianProcess.org/gpml, 2006, pp. 1-266 pages.
Riffenburgh, "Statistics in Medicine," Third Edition. Academic Press, Amsterdam, 2012, pp. 150-151.
Rousseeuw, "Tutorial to robust statistics," Journal of Chemometrics. Jan. 1991, vol. 5(1), pp. 1-20.
Schropfer et al., "Novel 3D Modeling Methods for Virtual Fabrication and EDA Compatible Design of MEMS Via Parametric Libraries," J Micromech Microeng. Jun. 2010, vol. 20(6), pp. 1-15.
Spallek et al., "Modelling and Simulating the Selective Epitaxial Growth of Silicon under Consideration of Anisotropic growth Rates," ESSDERC '03, 33rd Conference on European Solid-State Device Research, 2003, pp. 387-390.
Synopsys, "Sentaurus Workbench Comprehensive Framework Environment," Data Sheet. Synopsys, Inc., 2005, www. ynopsys.com.
TW Office Action dated Aug. 21, 2023 in Application No. TW112119637 with English translation.
TW Office Action dated Feb. 24, 2022, in application No. TW20180120904 with English translation.
TW Office Action dated Jul. 31, 2023 in Application No. TW109115374 with English translation.
TW Office Action dated May 20, 2024 in TW Application No. 113100510 with English translation.
TW Office Action dated Nov. 4, 2022, in application No. TW111136832with English translation.
TW Office Action dated Nov. 21, 2023 in TW Application No. 112119637 with English translation.
U.S. Advisory Action dated Dec. 4, 2023 in U.S. Appl. No. 16/870,518.
U.S. Advisory Action dated Sep. 16, 2024 in U.S. Appl. No. 16/870,518.
U.S. Final Office Action dated Jul. 9, 2024 in U.S. Appl. No. 16/870,518.
U.S. Final office Action dated May 24, 2023 in U.S. Appl. No. 17/477,472.
U.S. Final Office Action dated Sep. 25, 2023, in U.S. Appl. No. 16/870,518.
U.S. Non-Final Office Action dated Feb. 8, 2023, in U.S. Appl. No. 17/477,472.
U.S. Non-Final Office Action dated Jan. 26, 2024 in U.S. Appl. No. 16/870,518.
U.S. Non-Final Office Action dated Mar. 27, 2023, in U.S. Appl. No. 16/870,518.
U.S. Non-Final Office Action dated Nov. 6, 2024 in U.S. Appl. No. 16/870,518.
U.S. Non-Final Office Action dated Nov. 25, 2020, in U.S. Appl. No. 16/010,537.
U.S. Non-Final Office Action dated Nov. 27, 2024 in U.S. Appl. No. 18/503,718.
U.S. Notice of Allowance dated Aug. 7, 2023 in U.S. Appl. No. 17/477,472.
U.S. Notice of Allowance dated Jun. 9, 2021 in U.S. Appl. No. 16/010,537.
U.S. Notice of Allowance dated Nov. 22, 2023 in U.S. Appl. No. 17/477,472.
Xiao et al., "Constructing definitive screening designs using conference matrices," Journal of Quality Technology, 2012 an 1, vol. 44(1), pp. 2-8.
Lee et al., Nonparametric Methods of Estimating Survival Functions. Statistical Methods for Survival Data Analysis, Third Edition. John Wiley & Sons, Inc., Hoboken, New Jersey, David J. Balding (Ed.). Chapter 4, pp. 64-71, (2003).
Cao B., et al., "Adaptive Transfer Learning," Proceedings of the Twenty-Fourth AAAI Conference on Artificial Intelligence (AAAI-10), pp. 407-412.
Garnett, Roman "Bayesian Optimization," Lecture Notes, Mar. 16, 2015, from: https://www.cse.wustl.edu/~garnett/cse515t/spring_2015/.
International Preliminary Reporton Patentability and Written Opinion dated Apr. 10, 2025 in PCT Application No. PCT/US2023/033955.
International Search Report and Written Opinion dated Dec. 2, 2025 in PCT Application No. PCT/US2025/040863.
Karbalayghareh A., et al., "Optimal Bayesian Transfer Learning," IEEE Transactions On Signal Processing, 2018, vol. 66 (14), pp. 1-16.
KR Decision for Grant and Search Report dated Jun. 25, 2025 in KR Application No. 10-2024-0052031, with English translation.
KR Office Action dated Aug. 4, 2025 in KR Application No. 10-2023-7005617, with English Translation.
Lee H., et al., "Enhancing Transfer Learning With Flexible Nonparametric Posterior Sampling," Machine Learning, 2024, pp. 1-25.
Martin L., et al., "Application of Statistical Tools and Methods for High Density Substrate Process Development," 52nd Electronic Components and Technology Conference, 2002, pp. 690-699.

(56) References Cited

OTHER PUBLICATIONS

TW Office Action and Search Report dated Jun. 4, 2025 in TW Application No. 110125830, with English Translation.
Uhrenholt AK., et al., "Efficient Bayesian Optimization for Target Vector Estimation," Proceedings of Machine Learning Research, 2019, vol. 89, pp. 2661-2670 (10 Pages).
U.S. Advisory Action dated May 14, 2025, in U.S. Appl. No. 18/503,718.
U.S. Final Office Action dated Mar. 11, 2025 in U.S. Appl. No. 18/503,718.
U.S. Notice of Allowance dated Apr. 2, 2025 in U.S. Appl. No. 16/870,518.
U.S. Notice of Allowance dated Jul. 10, 2025 in U.S. Appl. No. 18/503,718.
U.S. Appl. No. 19/116,586, inventors Lu Y et al., filed Mar. 28, 2025.
Ziatdinov M.A., et al., "Physics Makes the Difference: Bayesian Optimization and Active Learning via Augmented Gaussian Process," Machine Learning Science and Technology, 2022, 015003, vol. 3, pp. 1-10.

* cited by examiner

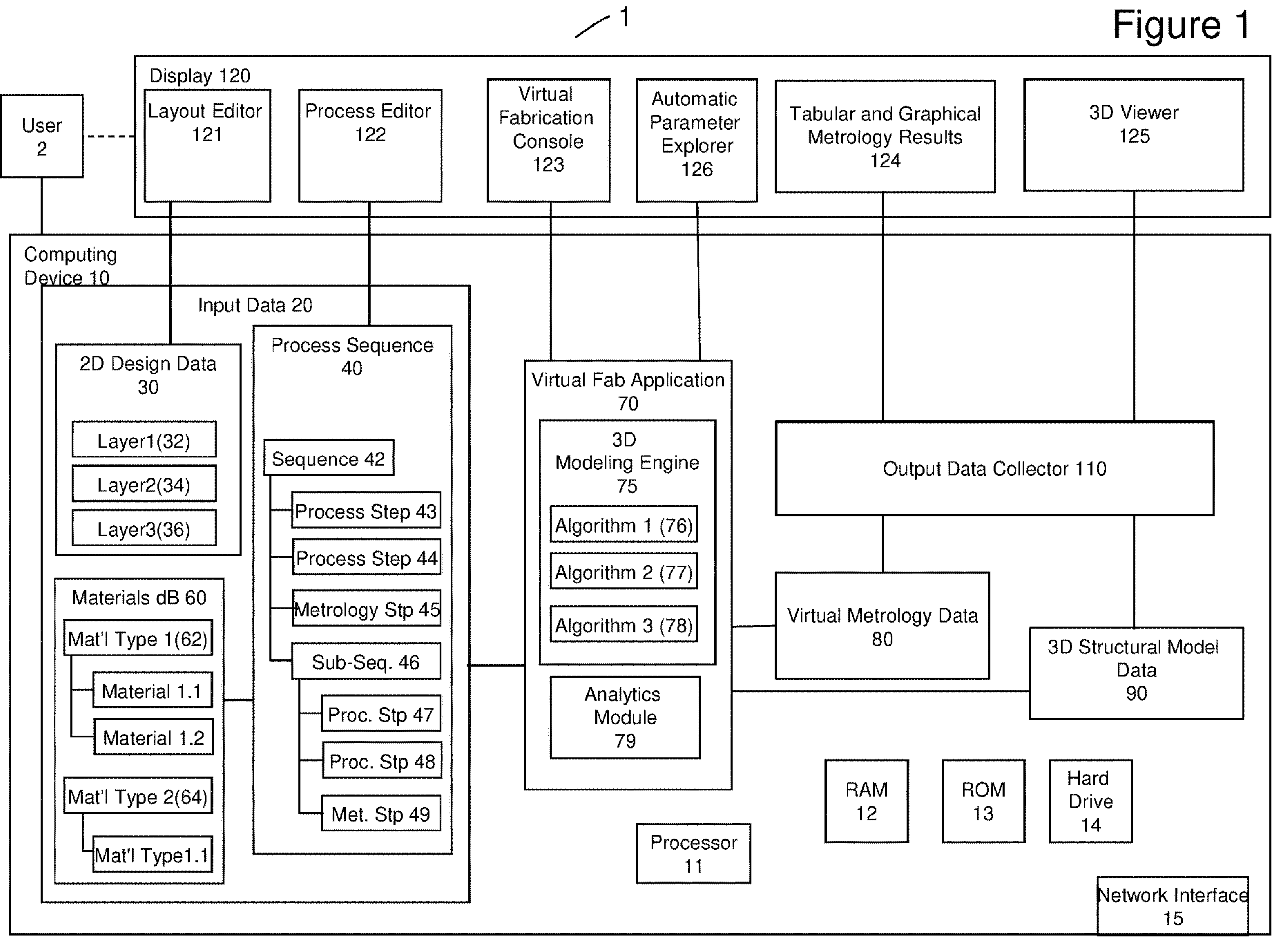

Figure 1
1
Display 120
Layout Editor 121
Process Editor 122
Virtual Fabrication Console 123
Automatic Parameter Explorer 126
Tabular and Graphical Metrology Results 124
3D Viewer 125
User 2
Computing Device 10
Input Data 20
2D Design Data 30
Layer1(32)
Layer2(34)
Layer3(36)
Materials dB 60
Mat'l Type 1(62)
Material 1.1
Material 1.2
Mat'l Type 2(64)
Mat'l Type1.1
Process Sequence 40
Sequence 42
Process Step 43
Process Step 44
Metrology Stp 45
Sub-Seq. 46
Proc. Stp 47
Proc. Stp 48
Met. Stp 49
Virtual Fab Application 70
3D Modeling Engine 75
Algorithm 1 (76)
Algorithm 2 (77)
Algorithm 3 (78)
Analytics Module 79
Output Data Collector 110
Virtual Metrology Data 80
3D Structural Model Data 90
Processor 11
RAM 12
ROM 13
Hard Drive 14
Network Interface 15

122
402
404
406
410
412
413
414
420

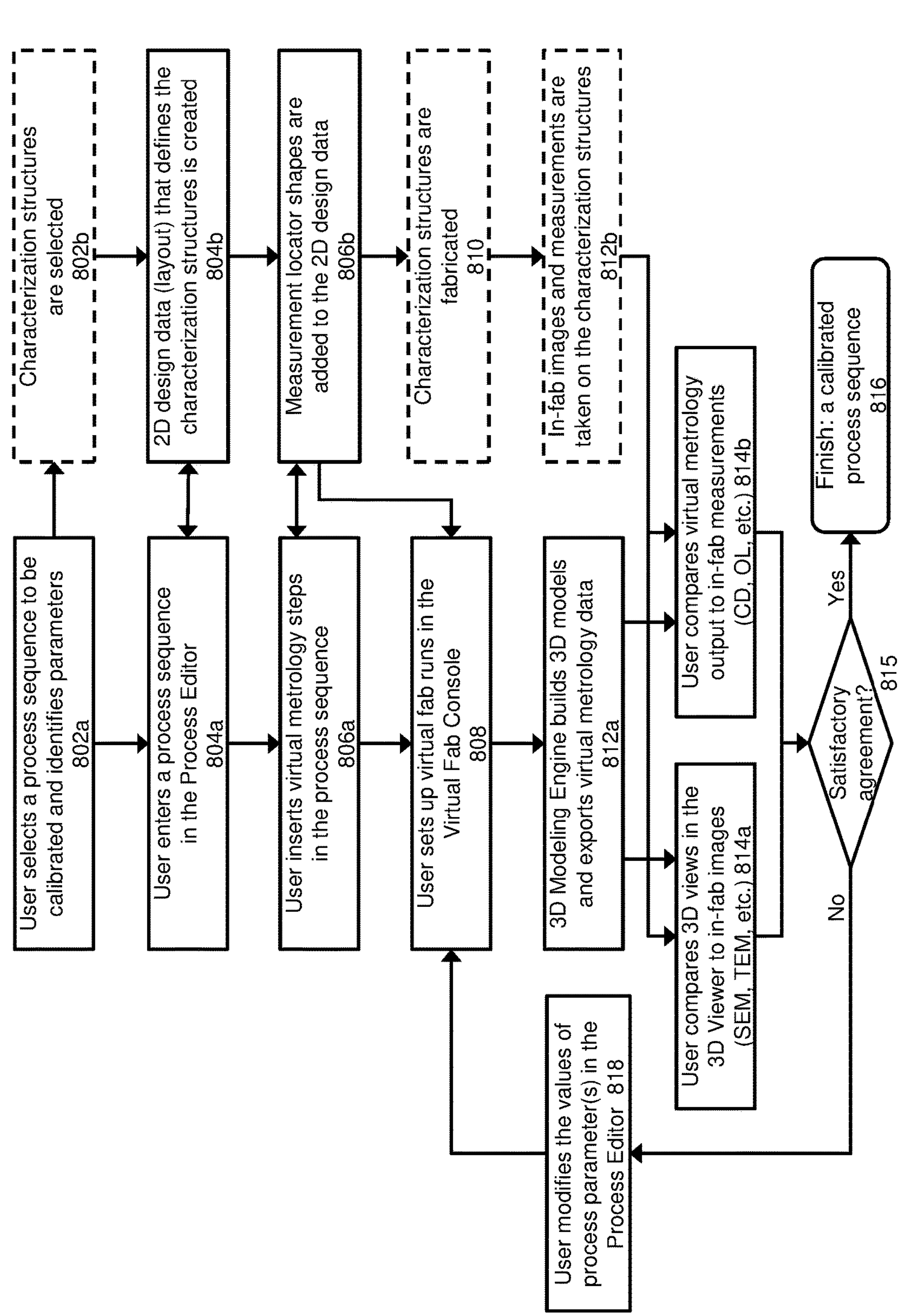
Figure 8
User selects a process sequence to be calibrated and identifies parameters 802a
Characterization structures are selected 802b
User enters a process sequence in the Process Editor 804a
2D design data (layout) that defines the characterization structures is created 804b
User inserts virtual metrology steps in the process sequence 806a
Measurement locator shapes are added to the 2D design data 806b
User sets up virtual fab runs in the Virtual Fab Console 808
Characterization structures are fabricated 810
3D Modeling Engine builds 3D models and exports virtual metrology data 812a
In-fab images and measurements are taken on the characterization structures 812b
User compares 3D views in the 3D Viewer to in-fab images (SEM, TEM, etc.) 814a
User compares virtual metrology output to in-fab measurements (CD, OL, etc.) 814b
Satisfactory agreement? 815
Yes
No
Finish: a calibrated process sequence 816
User modifies the values of process parameter(s) in the Process Editor 818

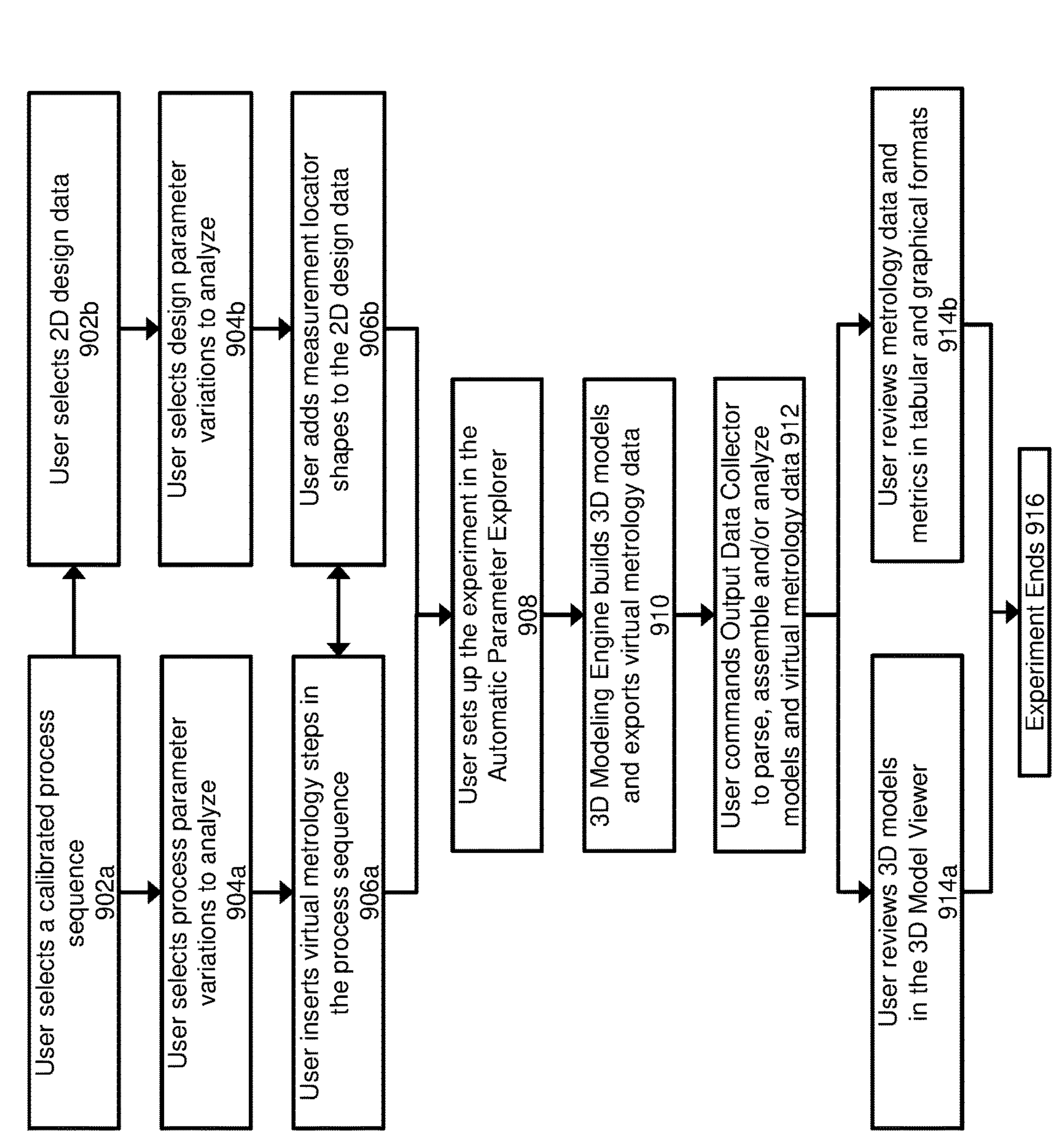
Figure 9
User selects a calibrated process sequence 902a
User selects 2D design data 902b
User selects process parameter variations to analyze 904a
User selects design parameter variations to analyze 904b
User inserts virtual metrology steps in the process sequence 906a
User adds measurement locator shapes to the 2D design data 906b
User sets up the experiment in the Automatic Parameter Explorer 908
3D Modeling Engine builds 3D models and exports virtual metrology data 910
User commands Output Data Collector to parse, assemble and/or analyze models and virtual metrology data 912
User reviews 3D models in the 3D Model Viewer 914a
User reviews metrology data and metrics in tabular and graphical formats 914b
Experiment Ends 916

| Assembly file | STI_Example.zam | | |
| --- | --- | --- | --- |
| Top Cell | Cell6x6 | | |
| | | | |
| Run | 1.19:depth | 1.22:depth | 2:depth |
| 1 | 15.5 | 52.5 | 2 |
| 2 | 17.75 | 52.5 | 2 |
| 3 | 20 | 52.5 | 2 |
| 4 | 22.25 | 52.5 | 2 |
| 5 | 24.5 | 52.5 | 2 |
| 6 | 15.5 | 56.25 | 2 |
| 7 | 17.75 | 56.25 | 2 |
| 8 | 20 | 56.25 | 2 |
| 9 | 22.25 | 56.25 | 2 |
| 10 | 24.5 | 56.25 | 2 |
| 11 | 15.5 | 60 | 2 |
| 12 | 17.75 | 60 | 2 |
| 13 | 20 | 60 | 2 |
| 14 | 22.25 | 60 | 2 |
| 15 | 24.5 | 60 | 2 |
| 16 | 15.5 | 63.75 | 2 |

Figure 11

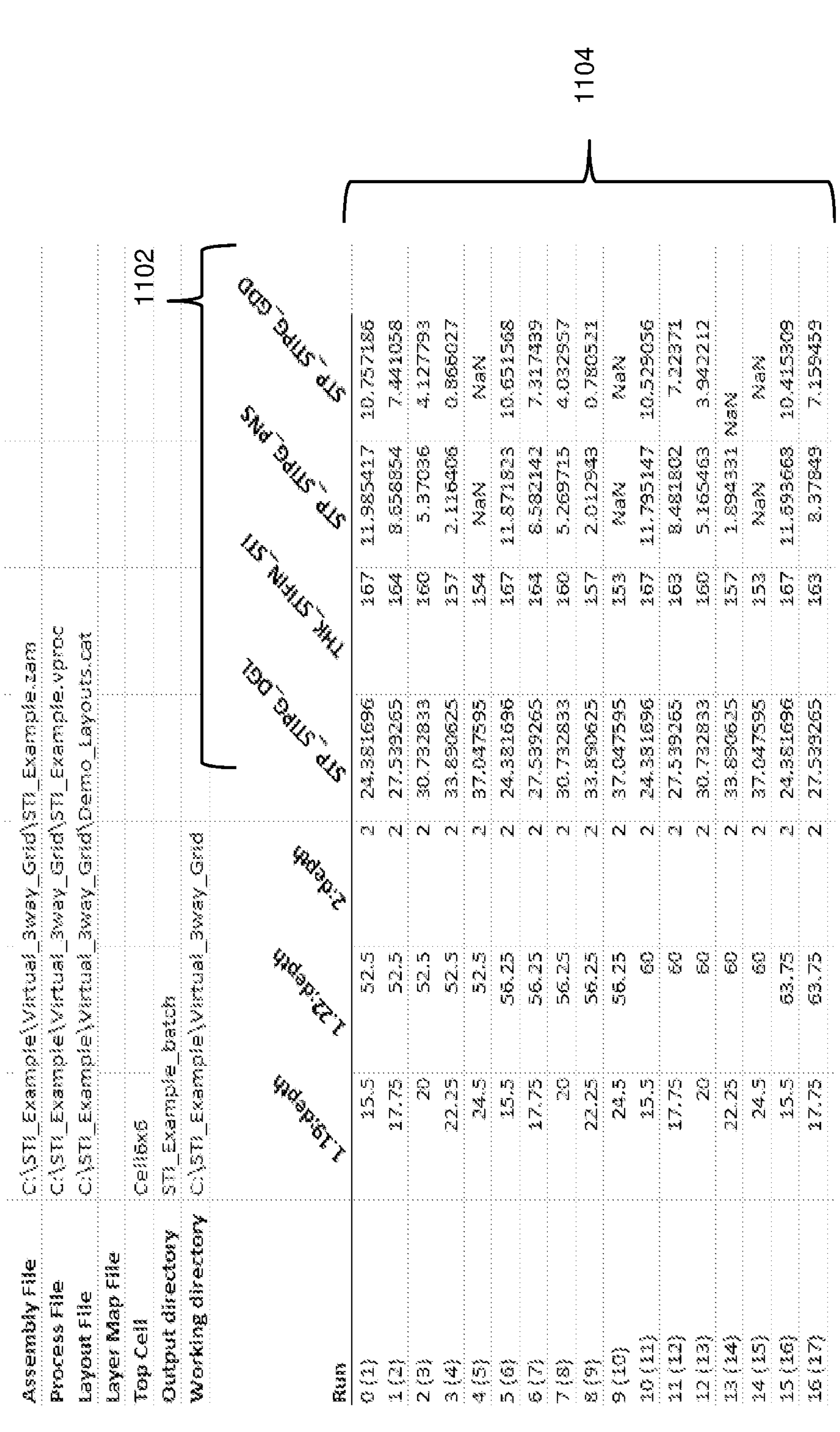

| | |
|---|---|
| **Assembly File** | C:\STI_Example\Virtual_3way_Grid\STI_Example.zam |
| **Process File** | C:\STI_Example\Virtual_3way_Grid\STI_Example.vproc |
| **Layout File** | C:\STI_Example\Virtual_3way_Grid\Demo_Layouts.cat |
| **Layer Map File** | |
| **Top Cell** | Cell6x6 |
| **Output directory** | STI_Example_batch |
| **Working directory** | C:\STI_Example\Virtual_3way_Grid |

| Run | 1.19:depth | 1.22:depth | 2:depth | STP_STIPG_DGL | THK_STIFIN_STI | STP_STIPG_PNS | STP_STIPG_GDD |
|---|---|---|---|---|---|---|---|
| 0 (1) | 15.5 | 52.5 | 2 | 24.381696 | 167 | 11.985417 | 10.757186 |
| 1 (2) | 17.75 | 52.5 | 2 | 27.539265 | 164 | 8.658854 | 7.441058 |
| 2 (3) | 20 | 52.5 | 2 | 30.732833 | 160 | 5.37036 | 4.127793 |
| 3 (4) | 22.25 | 52.5 | 2 | 33.890625 | 157 | 2.116406 | 0.868027 |
| 4 (5) | 24.5 | 52.5 | 2 | 37.047595 | 154 | NaN | NaN |
| 5 (6) | 15.5 | 56.25 | 2 | 24.381696 | 167 | 11.871823 | 10.651568 |
| 6 (7) | 17.75 | 56.25 | 2 | 27.539265 | 164 | 8.582142 | 7.317439 |
| 7 (8) | 20 | 56.25 | 2 | 30.732833 | 160 | 5.269715 | 4.032957 |
| 8 (9) | 22.25 | 56.25 | 2 | 33.890625 | 157 | 2.012943 | 0.780531 |
| 9 (10) | 24.5 | 56.25 | 2 | 37.047595 | 153 | NaN | NaN |
| 10 (11) | 15.5 | 60 | 2 | 24.381696 | 167 | 11.795147 | 10.529036 |
| 11 (12) | 17.75 | 60 | 2 | 27.539265 | 163 | 8.481802 | 7.22371 |
| 12 (13) | 20 | 60 | 2 | 30.732833 | 160 | 5.165463 | 3.942212 |
| 13 (14) | 22.25 | 60 | 2 | 33.890625 | 157 | 1.894331 | NaN |
| 14 (15) | 24.5 | 60 | 2 | 37.047595 | 153 | NaN | NaN |
| 15 (16) | 15.5 | 63.75 | 2 | 24.381696 | 167 | 11.693663 | 10.415309 |
| 16 (17) | 17.75 | 63.75 | 2 | 27.539265 | 163 | 8.37843 | 7.159459 |

Histogram with Gaussian Overlay
Probabilities
0.25
0.2
0.15
0.1
0.05
20
22.5
25
27.5
30
FinCd_Mid_Value
s
1302
Quantile Plot
Standard Normal Quantiles
30
27.5
25
22.5
20
17.5
Sorted
FinCd_Mid_Values
1304
1306

| Probability | Metrology Value |
|---|---|
| Est Min | 4.01 |
| Est 0.001350 (-3σ) | 4.03 |
| 0.02275 (-2σ) | 4.64 |
| 0.1587 (-1σ) | 5.11 |
| 0.5000 (Median) | 5.97 |
| 0.8413 (+1σ) | 6.60 |
| 0.9772 (+2σ) | 7.47 |
| Est 0.9987 (+3σ) | 7.54 |
| Est Max | 7.55 |

1810

SYSTEMS AND METHODS FOR DETERMINING SPECIFICATION LIMITS IN A SEMICONDUCTOR DEVICE VIRTUAL FABRICATION ENVIRONMENT

CROSS-REFERENCE TO RELATED APPLICATIONS

This application is a 35 U.S.C. § 371 national stage filing of International Application No. PCT/US2021/041700, filed on Jul. 14, 2021, which claims priority to U.S. Provisional Application No. 63/053,052, filed Jul. 17, 2020. The entire contents of the above applications are incorporated herein by reference in their entirety.

RELATED APPLICATION

This application claims priority to U.S. Provisional Patent Application No. 63/053,052, filed Jul. 17, 2020, the entire content of which is incorporated herein by reference in its entirety.

BACKGROUND

Integrated circuits (ICs) implement a myriad of capabilities of modern electronic devices. To make the development of ICs more efficient, a semiconductor manufacturer will periodically develop a common fabrication process or "technology" to be used for production of its integrated circuits (for ease of explanation the term "technology" may be used herein to refer to a fabrication process for a semiconductor device structure that is being developed).

Semiconductor development organizations at integrated device manufacturers (IDMs) and independent foundries spend significant resources developing the integrated sequence of process operations used to fabricate the chips (ICs) they sell from wafers ("wafers" are thin slices of semiconductor material, frequently, but not always, composed of silicon crystal). A large portion of the resources is spent on fabricating experimental wafers and associated measurement, metrology ("metrology" refers to specialized types of measurements conducted in the semiconductor industry) and characterization structures, all for the purpose of ensuring that the integrated process produces the desired semiconductor device structures. These experimental wafers are used in a trial-and-error scheme to develop individual processes for the fabrication of a device structure and also to develop the total, integrated process flow. Due to the increasing complexity of advanced technology node process flows, a large portion of the experimental fabrication runs result in negative or null characterization results. These experimental runs are long in duration, weeks to months in the "fab" (fabrication environment), and expensive. Semiconductor technology advances, including FinFET, TriGate, High-K/Metal-Gate, embedded memories and advanced patterning, have dramatically increased the complexity of integrated semiconductor fabrication processes. The cost and duration of technology development using this trial-and-error experimental methodology has concurrently increased.

Attempts have been made to use conventional mechanical computer-aided design (CAD) tools and specialized technology CAD (TCAD) tools to model semiconductor device structures, with the goal of reducing the efforts spent on fabricating experimental wafers. General-purpose mechanical CAD tools have been found inadequate because they do not automatically mimic the material addition, removal, and modification processes that occur in an actual fab. TCAD tools, on the other hand, are physics-based modeling platforms that simulate material composition changes that occur during diffusion and implant processes, but not all of the material addition and removal effects that occur during other processes that comprise an integrated process flow. Typically, the 3D device structure is an input to TCAD, not an output. Furthermore because of the amount of data and computations required for physics-based simulations of processes, TCAD simulations are practically restricted to very small regions on a chip, most often encompassing just a single transistor. In state-of-the-art semiconductor fabrication technologies, most of the integration challenge concerns the interaction between processes that may be widely separated in the integrated process flow and the multiple different devices and circuits that comprise a full technology suite (transistors, resistors, capacitors, memories, etc.). Structural failures, stemming from both systematic and random effects, are typically the limiter in time-to-market for a new process technology node. As such, a different modeling platform and approach than mechanical CAD or TCAD is required to cover the larger scope of concern, and to model the entire integrated process flow in a structurally predictive fashion.

BRIEF SUMMARY

Embodiments of the present invention provide a virtual fabrication environment for semiconductor device fabrication that includes an analytics module that enables the fitting of non-normally distributed virtual metrology data. More particularly, the analytics module allows a user accessing a virtual fabrication environment to use an algorithm to estimate extremes and sigma equivalent cutoffs for virtual metrology data that is not normally distributed. With this information the engineer or other user of the virtual fabrication environment can better understand the distribution of the virtual metrology data and set correct specification limits.

In one embodiment, a computing device-implemented method includes performing a Design of Experiments (DOE) simulation for a semiconductor device structure. The simulation includes multiple virtual fabrication runs that build multiple 3D models of the semiconductor device structure. The method further includes receiving a selection of one or more virtual metrology target parameters and determining whether the virtual metrology data for the selected virtual metrology target parameters is normally distributed. The method additionally includes computing an empirical distribution based on the virtual metrology data for one or more of the selected virtual metrology target parameters and determining an upper and lower specification limit for one or more of the selected virtual metrology target parameters. The method further includes outputting the upper and lower specification limits.

In another embodiment, a system includes at least one computing device and a display device. The at least one computing device is configured to generate a virtual fabrication environment. The virtual fabrication environment is configured to perform a Design of Experiments (DOE) simulation for a semiconductor device structure. The simulation includes multiple virtual fabrication runs that build multiple 3D models of the semiconductor device structure. The virtual fabrication environment is further configured to receive a selection of one or more virtual metrology target parameters and to determine whether the virtual metrology data for the selected virtual metrology target parameters is normally distributed. Additionally the virtual fabrication environment is configured to compute an empirical distribution based on the virtual metrology data for one or more of the selected virtual metrology target parameters and to determine an upper and lower specification limit for one or more of the selected virtual metrology target parameters. The virtual fabrication environment is also configured to output the upper and lower specification limits. The display surface is in communication with the at least one computing device and is configured to display data generated in the virtual fabrication environment.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 1 depicts an exemplary virtual fabrication environment suitable for practicing an embodiment of the present invention;

FIG. 8 depicts an exemplary sequence of steps performed in the virtual fabrication environment to calibrate a process sequence in a virtual fabrication environment;

FIG. 9 depicts an exemplary sequence of steps to set up and perform a virtual experiment generating virtual metrology measurement data for multiple semiconductor device structure models in the virtual fabrication environment;

FIG. 11 depicts an exemplary tabular-formatted display of virtual metrology data generated in a virtual experiment in the virtual fabrication environment;

DETAILED DESCRIPTION

Figure 2:
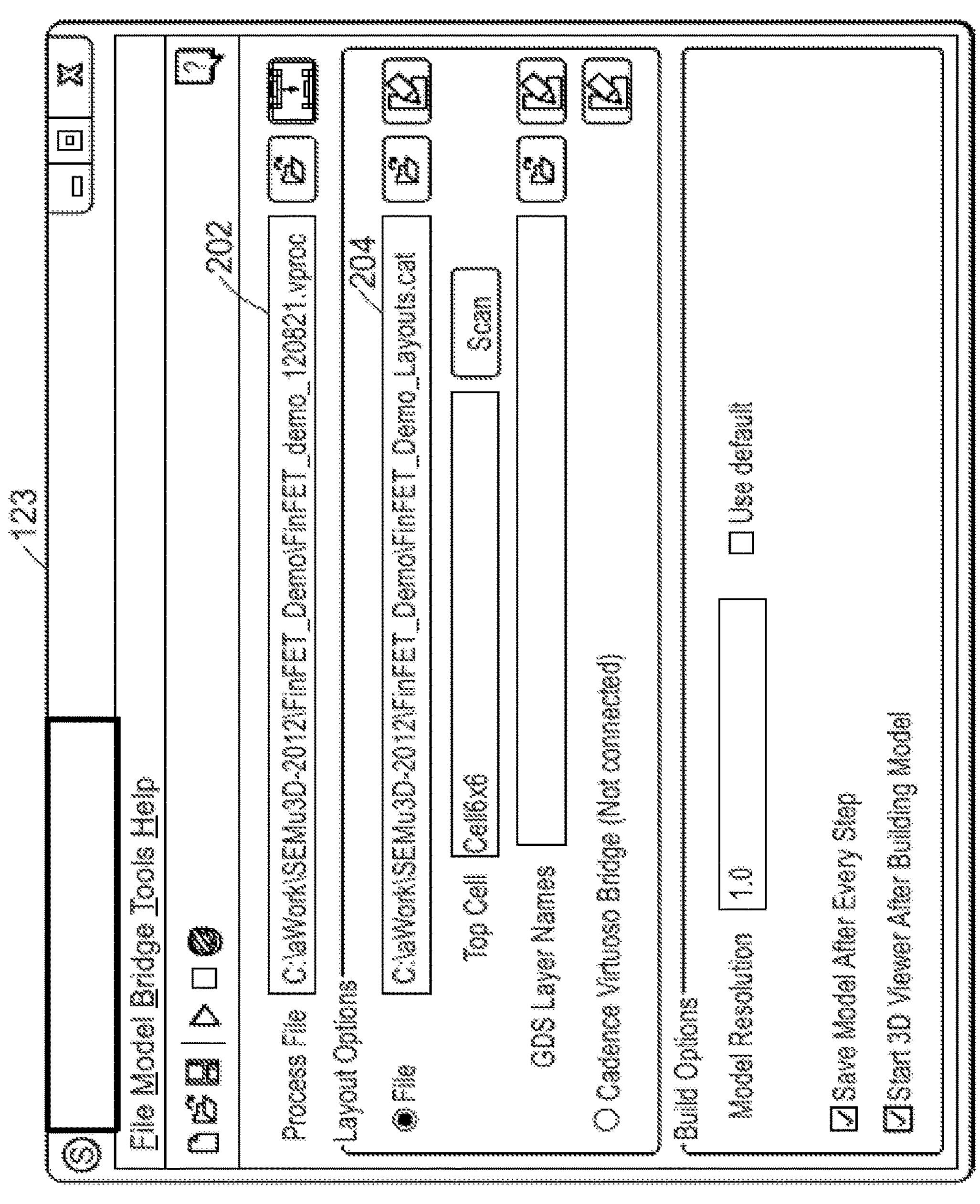
FIG. 2 depicts an exemplary virtual fabrication console in the virtual fabrication environment.

Embodiments of the present invention provide a virtual fabrication environment for semiconductor device fabrication that includes an analytics module enabling the determination of specification limits using a fitting algorithm for virtual metrology data. However, prior to discussing the determination of specification limits and other features provided by embodiments, an exemplary 3D design environment/virtual fabrication environment into which an analytics module of the present invention may be integrated is first described.

Exemplary Virtual Fabrication Environment

A virtual fabrication environment for semiconductor device structures offers a platform for performing semiconductor process development at a lower cost and higher speed than is possible with conventional trial-and-error physical experimentation. In contrast to conventional CAD and TCAD environments, a virtual fabrication environment is capable of virtually modeling an integrated process flow and predicting the complete 3D structures of all devices and circuits that comprise a full technology suite. Virtual fabrication can be described in its most simple form as combining a description of an integrated process sequence with a subject design, in the form of 2D design data (masks or layout), and producing a 3D structural model that is predictive of the result expected from a real/physical fabrication run. A 3D structural model includes the geometrically accurate 3D shapes of multiple layers of materials, implants, diffusions, etc. that comprise a chip or a portion of a chip. Virtual fabrication is done in a way that is primarily geometric, however the geometry involved is instructed by the physics of the fabrication processes. By performing the modeling at the structural level of abstraction (rather than physics-based simulations), construction of the structural models can be dramatically accelerated, enabling full technology modeling, at a circuit-level area scale. The use of a virtual fabrication environment thus provides fast verification of process assumptions, and visualization of the complex interrelationship between the integrated process sequence and the 2D design data.

FIG. 1 depicts an exemplary virtual fabrication environment 1 suitable for practicing an embodiment of the present invention. Virtual fabrication environment 1 includes a computing device 10 accessed by a user 2. Computing device 10 is in communication with a display 120. Display 120 may be a display screen that is part of computing device 10 or may be a separate display device or display surface in communication with computing device 10. Computing device 10 may be a PC, laptop computer, tablet computing device, server, or some other type of computing device equipped with one or more processors 11 and able to support the operations of virtual fabrication application, 70, 3D modeling engine 75 and analytics module 79 (described further below). The processor(s) may have one or more cores. The computing device 10 may also include volatile and non-volatile storage such as, but not limited to, Random Access Memory (RAM) 12, Read Only Memory (ROM) 13 and hard drive 14. In some instances, the computing device 10 may be additionally or alternatively be configured to access data that are stored remotely, such as in a distributed system in a datacenter. Computing device 10 may also be equipped with a network interface 15 so as to enable communication with other computing devices. It will be appreciated that computing device 10 rather than being a solitary computing device may also be implemented as a computing system with multiple computing devices working in parallel or other combination, and/or may include one or more virtual devices, such as one or more virtual machines hosted by a cloud service.

Computing device 10 may store and execute virtual fabrication application 70 including 3D modeling engine 75. 3D modeling engine 75 may include one or more algorithms such as algorithm 1 (76), algorithm 2 (77), and algorithm 3 (78) used in virtually fabricating semiconductor device structures. 3D modeling engine 75 may accept input data 20 in order to perform virtual fabrication "runs" that produce semiconductor device structural model data 90. Virtual fabrication application 70 and 3D modeling engine 75 may generate a number of user interfaces and views used to create and display the results of virtual fabrication runs. For example, virtual fabrication application 70 and 3D modeling engine 75 may display layout editor 121, process editor 122 and virtual fabrication console 123 used to create virtual fabrication runs. Virtual fabrication application 70 and 3D modeling engine 75 may also display a tabular and graphical metrology results view 124 and 3D view 125 for respectively displaying results of virtual fabrication runs and 3D structural models generated by the 3D modeling engine 75 during virtual fabrication of semiconductor device structures. Virtual fabrication application 70 may also include analytics module 79 and an NGF algorithm for performing analysis of 3D models to determine specification limits as discussed further below.

Input data 20 includes both 2D design data 30 and process sequence 40. Process sequence 40 may be composed of multiple process steps 43, 44, 47, 48 and 49. As described further herein, process sequence 40 may also include one or more virtual metrology measurement process steps 45. Process sequence 40 may further include one or more subsequences which include one or more of the process steps or virtual metrology measurement process steps. 2D design data 30 includes of one or more layers such as layer 1 (32), layer 2 (34) and layer 3 (36), typically provided in an industry-standard layout format such as GDS II (Graphical Design System version 2) or OASIS (Open Artwork System Interchange Standard).

Input data 20 may also include a materials database 60 including records of material types such as material type 1 (62) and material type 2 (64) and specific materials for each material type. Many of the process steps in a process sequence may refer to one or more materials in the materials database. Each material has a name and some attributes such as a rendering color. The materials database may be stored in a separate data structure. The materials database may have hierarchy, where materials may be grouped by types and sub-types. Individual steps in the process sequence may refer to an individual material or a parent material type. The hierarchy in the materials database enables a process sequence referencing the materials database to be modified more easily. For example, in virtual fabrication of a semiconductor device structure, multiple types of oxide material may be added to the structural model during the course of a process sequence. After a particular oxide is added, subsequent steps may alter that material. If there is no hierarchy in the materials database and a step that adds a new type of oxide material is inserted in an existing process sequence, all subsequent steps that may affect oxide materials must also be modified to include the new type of oxide material. With a materials database that supports hierarchy, steps that operate on a certain class of materials such as oxides may refer only to the parent type rather than a list of materials of the same type. Then, if a step that adds a new type of oxide material is inserted in a process sequence, there is no need to modify subsequent steps that refer only to the oxide parent type. Thus hierarchical materials make the process sequence more resilient to modifications. A further benefit of hierarchical materials is that stock process steps and sequences that refer only to parent material types can be created and re-used.

3D Modeling Engine 75 uses input data 20 to perform the sequence of operations/steps specified by process sequence 40. As explained further below, process sequence 40 may include one or more virtual metrology steps 45, 49 that indicate a point in the process sequence during a virtual fabrication run at which a measurement of a structural component should be taken. The measurement may be taken using a locator shape previously added to a layer in the 2D design data 30. Alternatively, the measurement location may be specified by alternate means such as (x, y) coordinates in the 2D design data or some other means of specifying a location in the 2D design data 30 instead of through the use of a locator shape. The performance of the process sequence 40 during a virtual fabrication run generates virtual metrology data 80 and 3D structural model data 90. 3D structural model data 90 may be used to generate a 3D view of the structural model of the semiconductor device structure which may be displayed in the 3D viewer 125. Virtual metrology data 80 may be processed and presented to a user 2 in the tabular and graphical metrology results view 124.

Because of the large number of structural dimensions that are critical to the success of an integrated technology such as semiconductor devices, finding the relationship between the many inter-related process steps used to fabricate a device structure and the created structure is critical. As structural modifications produced by a step in the process sequence may be affected by previous and subsequent steps in the sequence, a particular step may affect a structural dimension in ways that are not obvious. A virtual fabrication environment enables automatic extraction of structural measurements from the device being created. The automatic extraction of a measurement is accomplished by specifying a virtual metrology measurement step in the process sequence at a point in the process when the measurement is critical. A locator shape for this virtual metrology measurement can be added to a layer in the design data and specified by the virtual metrology measurement step. The output data from this virtual metrology measurement can be used to provide quantitative comparison to other modeling results or to physical metrology measurements. This virtual metrology measurement capability is provided by during the processing sequence to extract a critical physical dimension at the correct point in the integrated process flow.

The ability to provide virtual metrology measurement data at specified locations in the device structure provides a significant improvement over conventional physical fab measuring techniques. Typically, physical in-fab measurements are done on specific characterization structures fabricated in the scribe lines or saw kerfs, adjacent to the product dice. In most cases, these characterization structures need to be designed to accommodate limitations of the measurement technique, such as optical spot size. Therefore, the characterization structures are not entirely representative of the actual structures on the product dice. Because of these differences, users of in-fab measurements usually face the challenge of inferring the result on the product structure from a measurement on a characterization structure. In the virtual fabrication environment, measurements can be added to any design layout at specified points in the process sequence thus providing greater insight into the effect of the inter-related process steps on the virtual structural model being constructed. As such, the in-fab challenge of measuring a characterization structure and inferring the result on a product structure is eliminated.

FIG. 2 depicts an exemplary virtual fabrication console 123 to set up a virtual fabrication run in the virtual fabrication environment. The virtual fabrication console 123 allows the user to specify a process sequence 202 and the layout (2D design data) 204 for the semiconductor device structure that is being virtually fabricated. It should be appreciated however that the virtual fabrication console can also be a text-based scripting console that provides the user with a means of entering scripting commands that specify the required input and initiate building of a structural model, or building a set of structural models corresponding to a range of parameter values for specific steps in the process sequence. The latter case is considered a virtual experiment (discussed further below).

Figure 3:
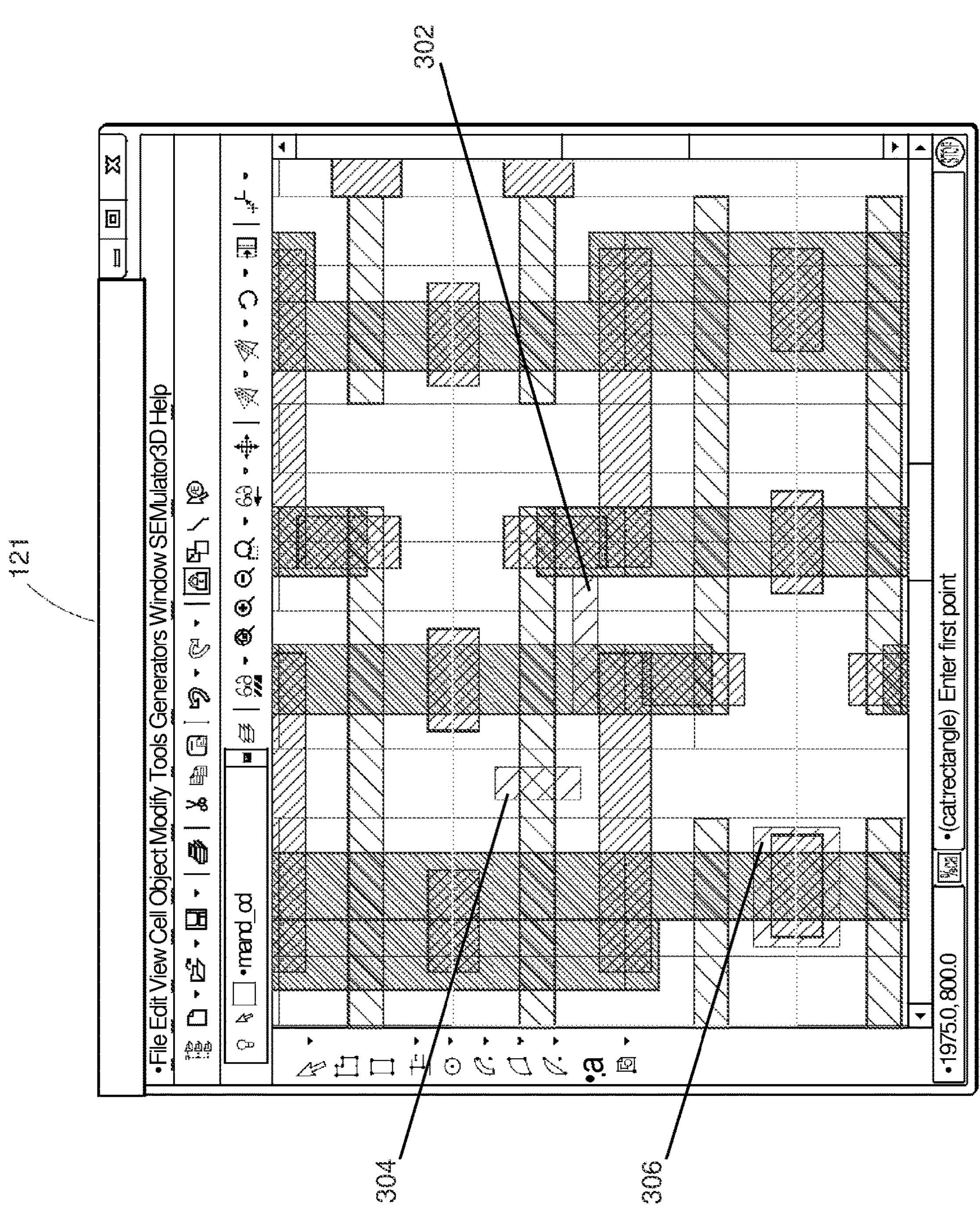
FIG. 3 depicts an exemplary layout editor in the virtual fabrication environment.

FIG. 3 depicts an exemplary layout editor in the virtual fabrication environment. The layout editor 121 displays the 2D design layout specified by the user in the virtual fabrication console 123. In the layout editor, color may be used to depict different layers in the design data. The areas enclosed by shapes or polygons on each layer represent regions where a photoresist coating on a wafer may be either exposed to light or protected from light during a photolithography step in the integrated process flow. The shapes on one or more layers may be combined (booleaned) to form a mask that is used in a photolithography step. The layout editor 121 provides a means of inserting, deleting and modifying a polygon on any layer, and of inserting, deleting or modifying layers within the 2D design data. A layer can be inserted for the sole purpose of containing shapes or polygons that indicate the locations of virtual metrology measurements. The rectangular shapes 302, 304, 306 have been added to an inserted layer (indicated by a different color) and mark the locations of virtual metrology measurements. As noted above, other approaches to specifying the locations for the virtual metrology measurements besides the use of locator shapes may also be employed in the virtual fabrication environment. The design data is used in combination with the process data and materials database to build a 3D structural model.

Figure 4:
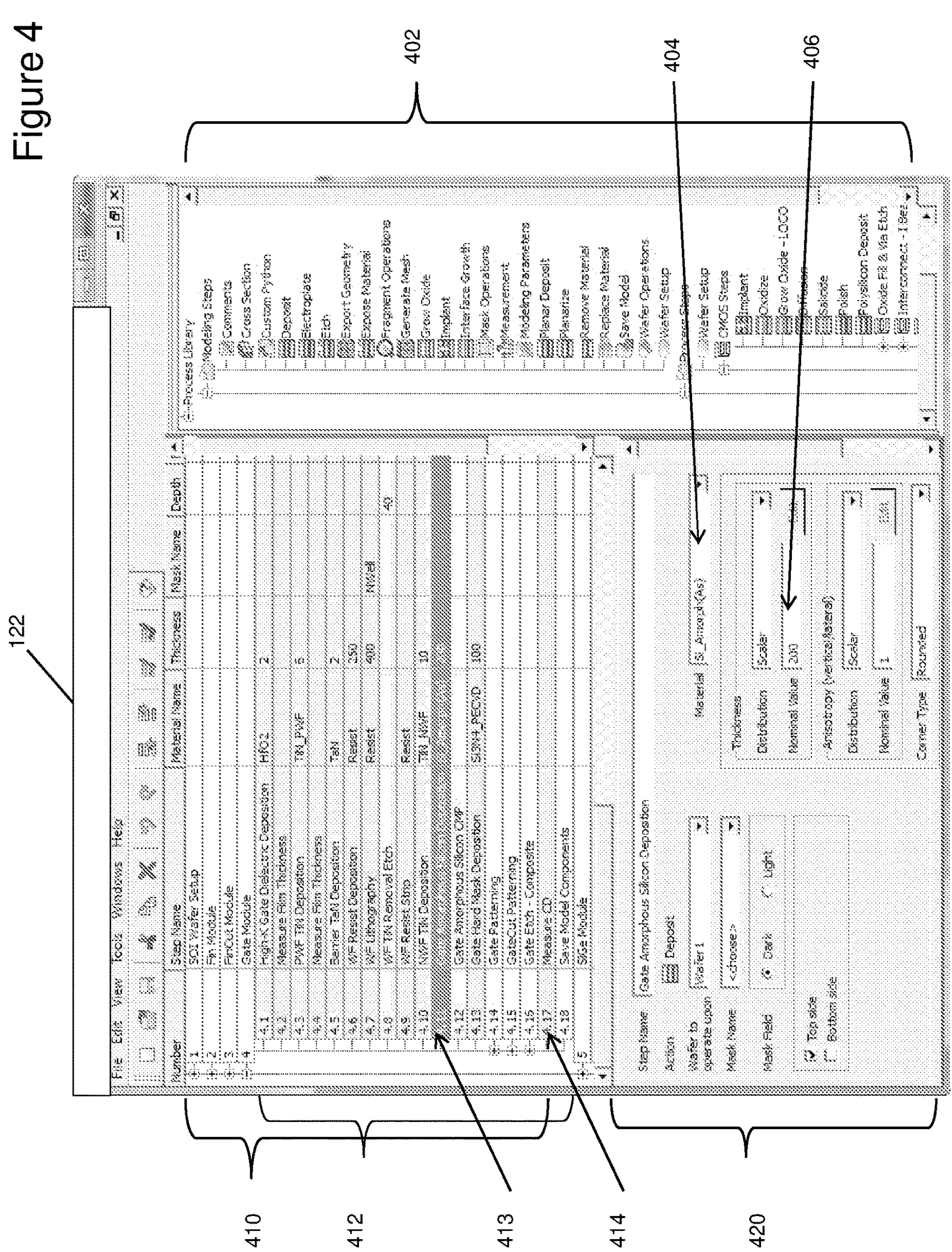
FIG. 4 depicts an exemplary process editor in the virtual fabrication environment.

Inserted layers in the design data displayed in the layout editor 121 may include inserted locator shapes. For example, a locator shape may be a rectangle, the longer sides of which indicate the direction of the measurement in the 3D structural model. For example, in FIG. 3, a first locator shape 302 may mark a double patterning mandrel for virtual metrology measurement, a second locator shape 304 may mark a gate stack for virtual metrology measurement and a third locator shape 306 may mark a transistor source or drain contact for virtual metrology measurement FIG. 4 depicts an exemplary process editor 122 in the virtual fabrication environment. The user defines a process sequence in the process editor. The process sequence is an ordered list of process steps conducted in order to virtually fabricate the user's selected structure. The process editor may be a text editor, such that each line or group of lines corresponds to a process step, or a specialized graphical user interface such as is depicted in FIG. 4. The process sequence may be hierarchical, meaning process steps may be grouped into sub-sequences and sub-sequences of sub-sequences, etc. Generally, each step in the process sequence corresponds to an actual step in the fab. For instance, a sub-sequence for a reactive ion etch operation might include the steps of spinning on photo resist, patterning the resist, and performing the etch operation. The user specifies parameters for each step or sub-step that are appropriate to the operation type. Some of the parameters are references to materials in the materials database and layers in the 2D design data. For example, the parameters for a deposit operation primitive are the material being deposited, the nominal thickness of the deposit and the anisotropy or ratio of growth in the lateral direction versus the vertical direction. This deposit operation primitive can be used to model actual processes such as chemical vapor deposition (CVD). Similarly, the parameters for an etch operation primitive are a mask name (from the design data), a list of materials affected by the operation, and the anisotropy.

There may be hundreds of steps in the process sequence and the process sequence may include sub-sequences. For example, as depicted in FIG. 4, a process sequence 410 may include a subsequence 412 made up of multiple process steps such as selected step 413. The process steps may be selected from a library of available process steps 402. For the selected step 413, the process editor 122 enables a user to specify all required parameters 420. For example, a user may be able to select a material from a list of materials in the material database 404 and specify a process parameter 406 for the material's use in the process step 413.

One or more steps in the process sequence may be virtual metrology steps inserted by a user. For example, the insertion of step 4.17 "Measure CD" (414), where CD denotes a critical dimension, in process sequence 412 would cause a virtual metrology measurement to be taken at that point in the virtual fabrication run using one or more locator shapes that had been previously inserted on one or more layers in the 2D design data. Inserting the virtual metrology steps directly in the fabrication sequence allows virtual metrology measurements to be taken at critical points of interest during the fabrication process. As the many steps in the virtual fabrication interact in the creation of the final structure, the ability to determine geometric properties of a structure, such as cross-section dimensions and surface area, at different points in the integrated process flow is of great interest to the process developer and structure designer.

Figure 5:
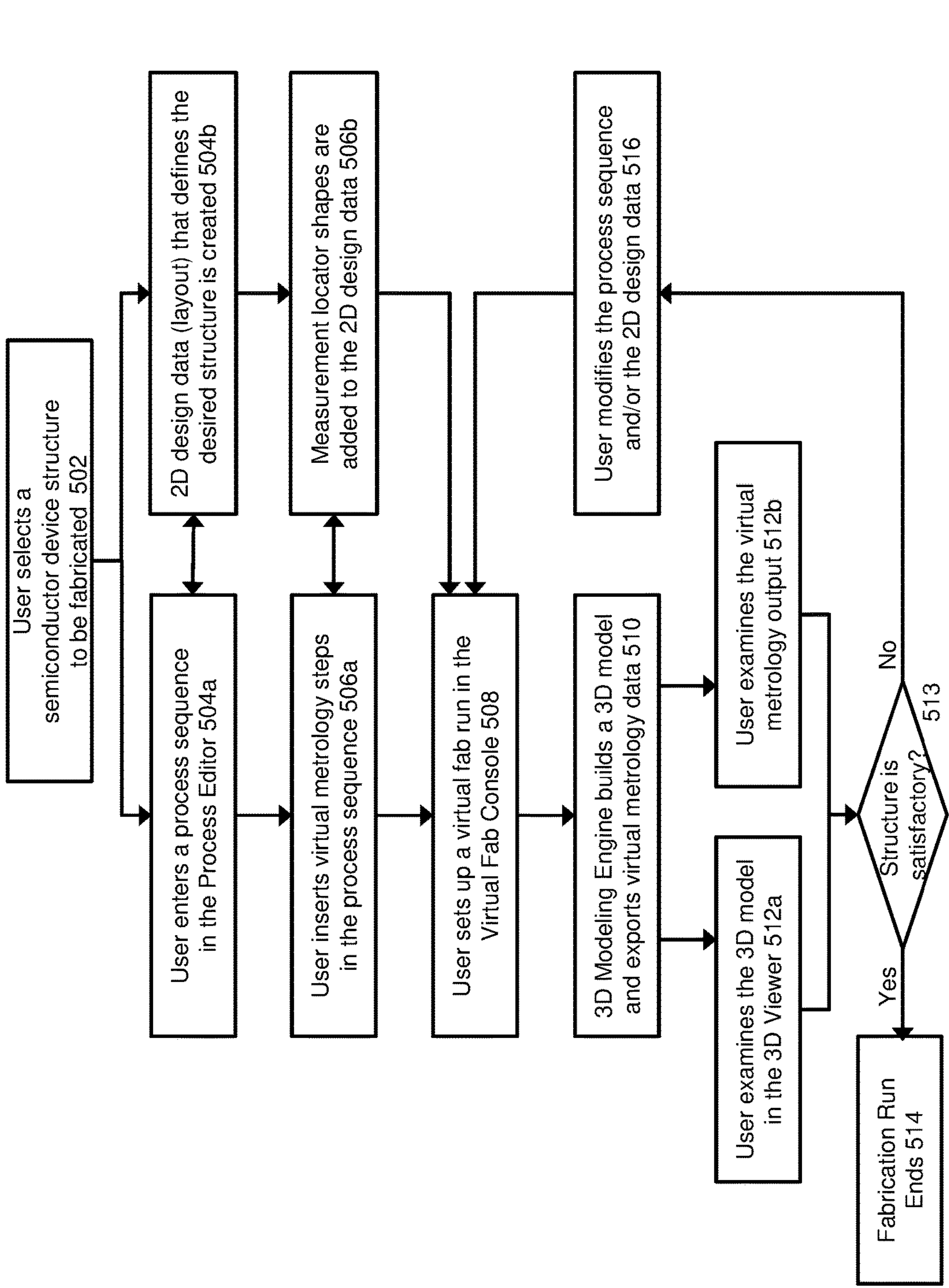
FIG. 5 depicts an exemplary sequence of steps performed in the virtual fabrication environment to generate virtual metrology measurement data.

FIG. 5 depicts an exemplary sequence of steps in the virtual fabrication environment to generate virtual metrology measurement data. The sequence begins with a user selecting a semiconductor device structure to be fabricated (step 502). The user may select from among multiple available sets of design data files and then select a rectangular region within the design data. For example the user may choose a FinFET or a passive resistor or a memory cell. Following the determination/selection of the structure to be fabricated, the user enters a process sequence in the process editor 122 (step 504*a*) and selects 2D design data that is expected to result in the desired structure (step 504*b*). Optionally, the user may create or modify design data in the layout editor 121. In the process editor, the user may insert one or more virtual metrology steps in the process sequence that specify a point during the virtual fabrication that the user would like virtual metrology measurements to be taken at specified locations in the evolving structure (step 506*a*). The user may insert locator shapes in the 2D design data displayed in the layout editor 121 that may be used by the virtual metrology step to perform its measurements (step 506*b*). The significance of a locator shape depends on the type of measurement requested. For example, the longer axis of a rectangular shape may indicate the direction and extent of a length measurement to be taken on a cross section of the structure, or the rectangle itself may designate a region where the contact area between two materials is to be measured. It will be appreciated that both above-described steps in the process editor may be performed before the steps in the layout editor or vice-versa in the virtual fabrication environment.

After the one or more locator shapes have been added to one or more layers in the 2D design data (step 506*b*) and the virtual metrology step(s) have been added to the process sequence (506*a*) the user sets up a virtual fabrication run using the virtual fabrication console 123 (step (508). During the virtual fabrication run, the process steps in the process sequence 40 are performed in the order specified by the 3D modeling engine 75. When the virtual fabrication reaches the virtual metrology step, a virtual "measurement" of the specified component in the structure being fabricated is performed. The computations done by the modeling engine depend on the nature of the measurement being requested, and are generally consistent with the analogous physical measurement technique in the fab. For example, critical dimension scanning electron microscope (CD-SEM) measurements in the fab locate sidewalls by detecting rapid changes in the orientation of the top surface of a structure. Similarly in a virtual metrology operation, the 3D modeling engine extracts the top surface of the structure in the region specified by a locator rectangle, interrogates the surface along its intersection with a plane defined by the intersection of the longer axis of the rectangle and the vertical axis for changes in slope that exceed a threshold (5 degrees, for example). Large changes in slope define faces of a feature, such as the bottom, top and sides of a ridge in the structure. Having established the locations of bottom, top and sides of a feature, the distance between the sides of the feature is computed at a vertical location (bottom, middle, or top) specified by the metrology step. The 3D modeling engine generates one or more types of output as it builds structural models. One type of output is the structural model itself, and may include its state at one or more points in the process sequence. The 3D model may be displayed to a user in the 3D viewer 125 (step 512*a*). The 3D modeling engine also exports the virtual metrology data (step 510). The virtual metrology data 80 may be exported to an automatic data analysis tool for further processing or may be displayed to a user through a user interface such as the tabular and graphical metrology results view 124 or other view (step 512*b*). If the structure when viewed or analyzed is satisfactory (step 513), the virtual fabrication run ends (step 514). If the structure created by the 3D modeling engine is unsatisfactory, the user modifies the process sequence and/or the 2D design data (step 516) and a new virtual fabrication run is set up (step 508).

Figure 6:
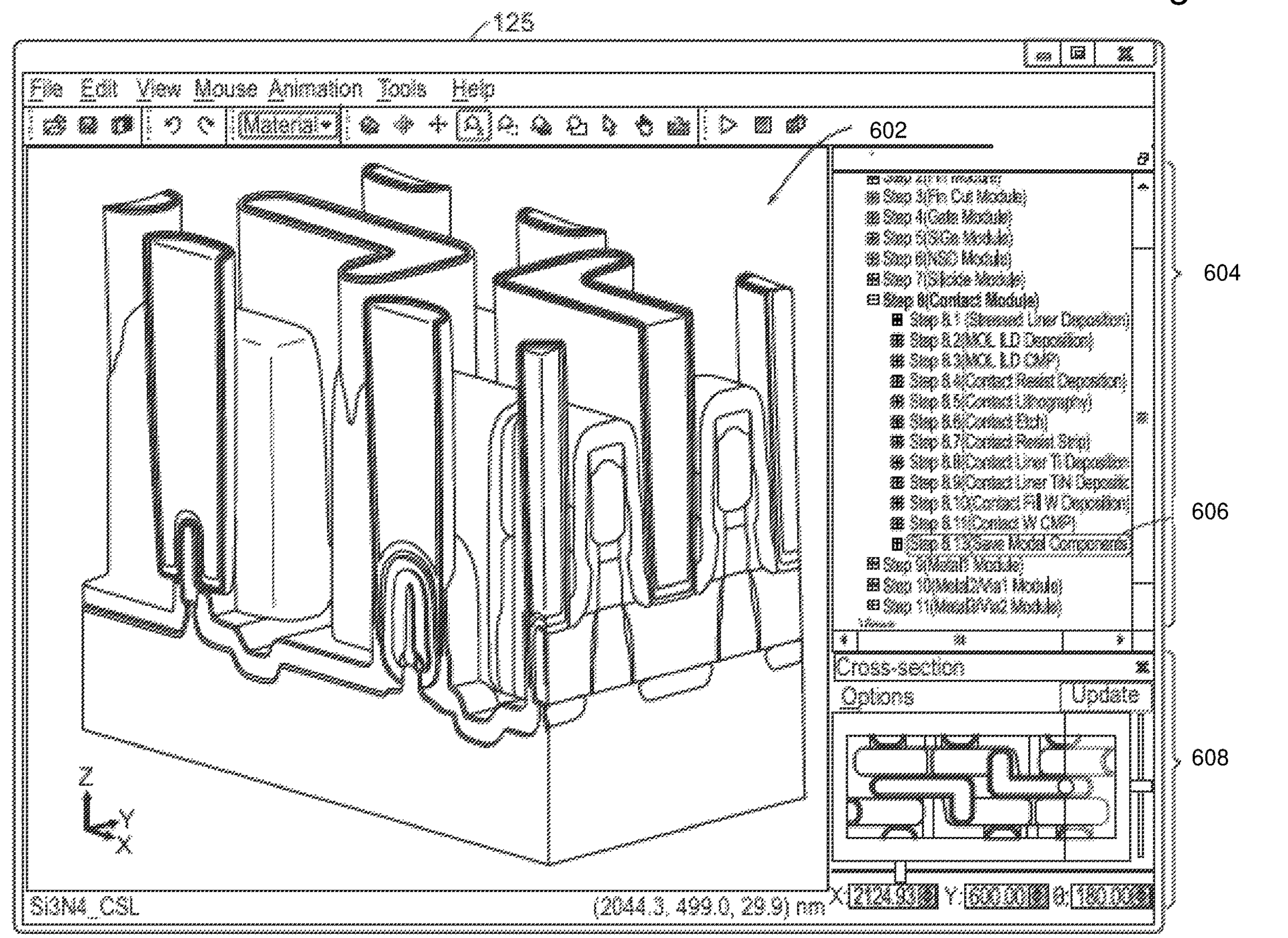
FIG. 6 depicts an exemplary 3D viewer in the virtual fabrication environment.

FIG. 6 depicts an exemplary 3D viewer 125 in the virtual fabrication environment. The 3D viewer 75 may include a 3D view canvas 602 for displaying 3D models generated by the 3D modeling engine 75. The 3D viewer 75 may display saved states 604 in the process sequence and allow a particular state to be selected 606 and appear in the 3D view canvas. The 3D Viewer provides functionality such as zoom in/out, rotation, translation, cross section, etc. Optionally, the user may activate a cross section view in the 3D view canvas 602 and manipulate the location of the cross section using a miniature top view 608.

Figure 7:
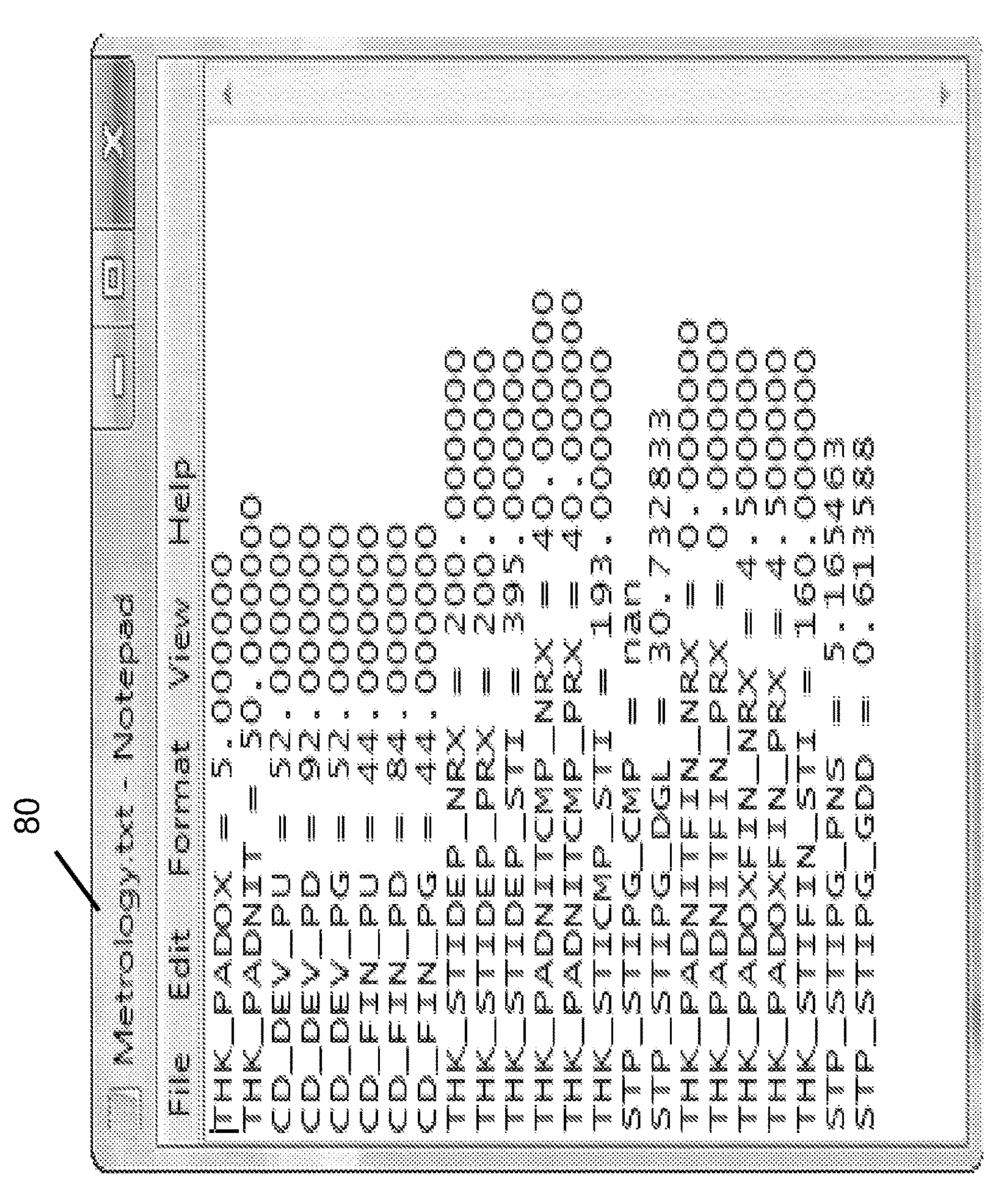
FIG. 7 depicts an exemplary display of virtual metrology measurement data in the virtual fabrication environment.

Another type of output from the 3D modeling engine 75 is the data produced by virtual metrology steps that are included in the process sequence. FIG. 7 depicts an exemplary display of virtual metrology measurement data 80 generated by multiple virtual metrology measurement steps in the virtual fabrication environment. The virtual metrology measurement result data 80 may be displayed in a tabular or graphical form including 2D X-Y plots and multi-dimensional graphics.

The techniques employed in the exemplary virtual fabrication environment are geometry-based. Calibration of the process step input parameters with actual experimental results from a physical fabrication to make virtual experiments more predictive is therefore advisable. Such calibration of the process steps results in improved modeling accuracy for all structures that comprise the full technology suite. Calibration can be executed on individual process steps from measurements, metrology or other physical characterization methods on characterization structures or product structures. Calibration may be conducted by comparing modeling results, including virtual metrology measurement data, to corresponding measurements or metrology conducted in the physical fab (on corresponding characterization or product structures), and subsequently adjusting modeling parameters such that the resulting virtually fabricated structures better match the physically fabricated structures. With proper calibration of modeling process parameters, the virtual fabrication environment becomes more predictive of the structures that result from physical fabrication throughout the entire allowed design space.

FIG. 8 depicts an exemplary sequence of steps to calibrate a process sequence in a virtual fabrication environment. The sequence includes steps taken in both a virtual fabrication environment and a corresponding physical fab environment. In the virtual fabrication environment, the user selects a process sequence (for a structure to be virtually fabricated) to be calibrated and identifies related process parameters (step 802*a*). In the physical fab the user identifies a set of characterization or product structures for measurement during a fabrication run (step 802*b*). Back in the virtual fabrication environment the user enters the process sequence in the process editor (step 804*a*) and the 2D design data (layout) that defines the characterization structures is selected from available 2D design data or created for the purpose in the layout editor 121 (step 804*b*) The same design data is used for virtual fabrication and actual characterization. As discussed above, the user inserts one or more virtual metrology steps in the process sequence (step 806*a*) and adds measurement locator shapes to the 2D design data (step 806*b*). The user sets up a virtual fab run in the virtual fabrication console (step 808) and the 3D modeling engine builds the 3D model, and generates and exports virtual metrology data (step 812*a*). In parallel or offset with the virtual fabrication run, the physical fabrication environment creates the characterization or product structures (step 810) and in-fab images and measurements are taken on these structures (step 812*b*). The user may then compare the 3D views of the generated virtual model in the 3D viewer 75 to the in-fab images of the physical device structure (step 814*a*). Further, the set of characterization structure measurements may be compared to the virtual metrology measurements taken as a result of the virtual metrology step being inserted into the process sequence (step 814*b*). In most cases, this comparison is made by the user, but alternatively the comparison may be made by an automated data analysis tool based on pre-defined or interactively solicited criteria. If there is satisfactory agreement between the views and images and the virtual and actual measurements (step 815), the process sequence is considered calibrated (step 816). However, if there is not satisfactory agreement (step 815), the user modifies the values of the process parameters in the process editor (step 818) and a new virtual fabrication run is set up in the virtual fabrication console (step 808). The sequence then iterates until a satisfactory agreement is reached and calibration is achieved.

It should be appreciated that there may be a number of different parameters that may be calibrated within the sequence. Although the above description notes the use of the insertion of virtual metrology steps in the process sequence and the related use of the 2D locator shape or shapes to conduct the virtual metrology measurements, other techniques could be employed in the in a virtual fabrication environment. For example, the virtual measurements could be conducted on a virtual device structure after fabrication is completed and then compared to the physical measurements taken of the characterization structures during/after the physical fabrication run.

While building a single structural model can be valuable, there is increased value in virtual fabrication that builds a large number of models. A virtual fabrication environment may enable a user to create and run a virtual experiment. In a virtual experiment, a range of values of process parameters can be explored. A virtual experiment may be set up by specifying a set of parameter values to be applied to individual processes (rather than a single value per parameter) in the full process sequence. A single process sequence or multiple process sequences can be specified this way. The 3D modeling engine 75, executing in virtual experiment mode, then builds multiple models spanning the process parameter set, all the while utilizing the virtual metrology measurement operations described above to extract metrology measurement data for each variation. This capability may be used to mimic two fundamental types of experiments that are typically performed in the physical fab environment. Firstly, fabrication processes vary naturally in a stochastic (non-deterministic) fashion. As explained herein, a fundamentally deterministic approach used for each virtual fabrication run nevertheless can predict non-deterministic results by conducting multiple runs. A virtual experiment mode allows the virtual fabrication environment to model through the entire statistical range of variation for each process parameter, and the combination of variations in many/all process parameters. Secondly, experiments run in the physical fab may specify a set of parameters to be intentionally varied when fabricating different wafers. The virtual experiment mode enables the Virtual Fabrication Environment to mimic this type of experiment as well, by performing multiple virtual fabrication runs on the specific variations of a parameter set.

Each process in the fabrication sequence has its own inherent variation. To understand the effect of all the aggregated process variations in a complex flow is quite difficult, especially when factoring in the statistical probabilities of the combinations of variations. Once a virtual experiment is created, the process sequence is essentially described by the combination of numerical process parameters included in the process description. Each of these parameters can be characterized by its total variation (in terms of standard deviation or sigma values), and therefore by multiple points on a Gaussian distribution or other appropriate probability distribution. If the virtual experiment is designed and executed to examine all of the combinations of the process variations (multiple points on each Gaussian, for example the ±3 sigma, ±2 sigma, ±1 sigma, and nominal values of each parameter), then the resulting graphical and numerical outputs from virtual metrology steps in the sequence cover the total variation space of the technology. Even though each case in this experimental study is modeled deterministically by the virtual fabrication system, the aggregation of the virtual metrology results contains a statistical distribution. Simple statistical analysis, such as Root Sum Squares (RSS) calculation of the statistically uncorrelated parameters, can be used to attribute a total variation metric to each case of the experiment. Then, all of the virtual metrology output, both numerical and graphical, can be analyzed relative to the total variation metric.

In typical trial-and-error experimental practice in a physical fab, a structural measurement resulting from the nominal process is targeted, and process variations are accounted for by specifying an overly large (conservative) margin for the total variation in the structural measurement (total structural margin) which must be anticipated in subsequent processes. In contrast, the virtual experiment in the virtual fabrication environment can provide quantitative predictions of the total variation envelope for a structural measurement at any point in the integrated process flow. The total variation envelope, rather than the nominal value, of the structural measurement may then become the development target. This approach can ensure acceptable total structural margin throughout the integrated process flow, without sacrificing critical structural design goals. This approach, of targeting total variation may result in a nominal intermediate or final structure that is less optimal (or less aesthetically pleasing) than the nominal structure that would have been produced by targeting the nominal process. However, this sub-optimal nominal process is not critical, since the envelope of total process variation has been accounted for and is more important in determining the robustness and yield of the integrated process flow. This approach is a paradigm shift in semiconductor technology development, from an emphasis on the nominal process to an emphasis on the envelope of total process variation.

Figure 10:
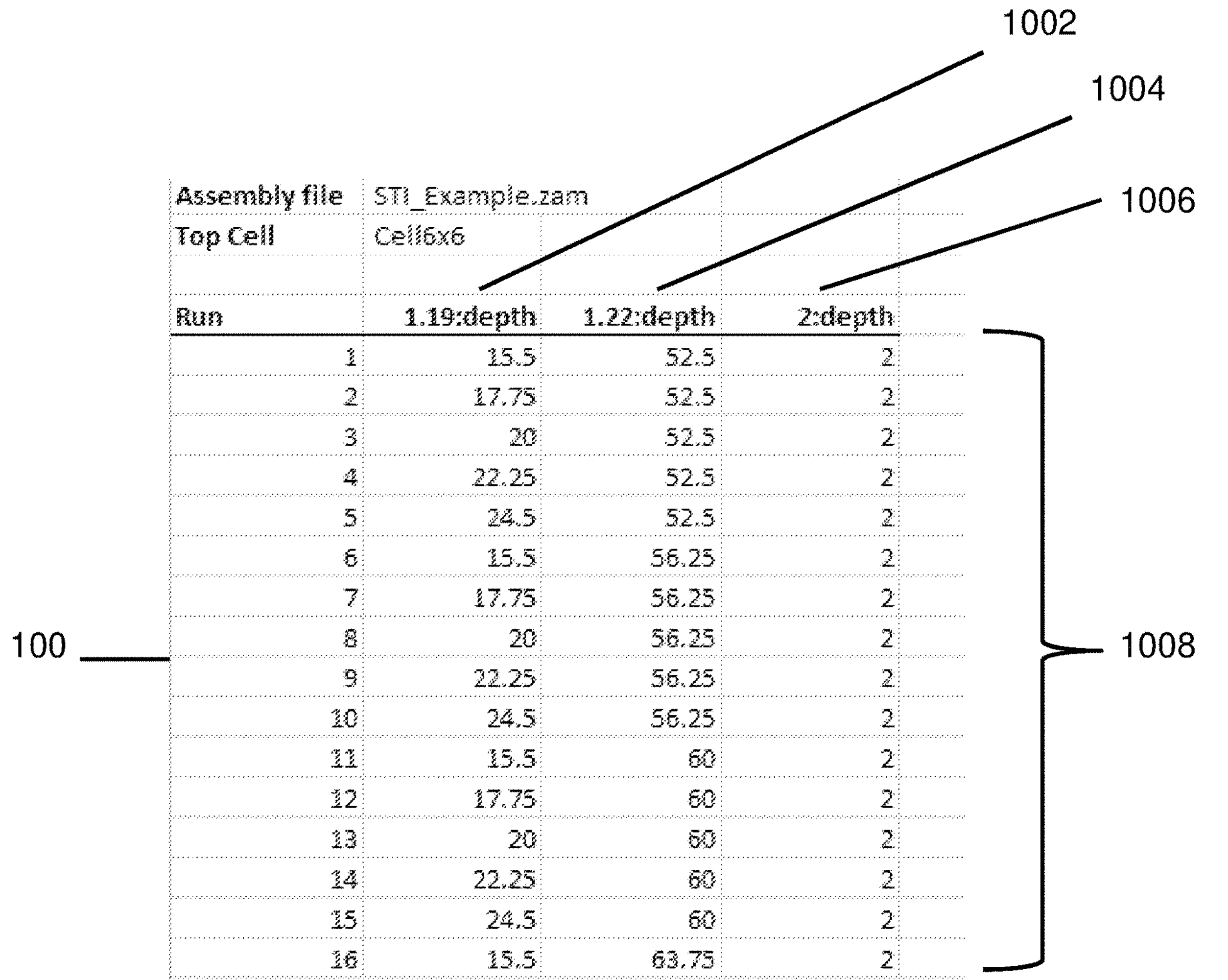
FIG. 10 depicts an exemplary parameter explorer view used to provide process parameters for a virtual experiment in the virtual fabrication environment.

FIG. 9 depicts an exemplary sequence of steps in the virtual fabrication environment to set up and perform a virtual experiment generating virtual metrology measurement data for multiple semiconductor device structural models. The sequence begins with a user selecting a process sequence (which may have been previously calibrated to make the results more structurally predictive (step 902*a*) and identifying/creating 2D design data (step 902*b*). The user may select process parameter variations to analyze (step 904*a*) and/or design parameter variations to analyze (step 904*b*). The user inserts one or more virtual metrology steps in the process sequence as set forth above (step 906*a*) and adds measurement locator shapes to the 2D design data (step 906*b*). The user may set up the virtual experiment with the aid of a specialized user interface, an automatic parameter explorer 126 (step 908). An exemplary automatic parameter explorer is depicted in FIG. 10 and may display, and allow the user to vary, the process parameters to be varied 1002, 1004, 1006 and the list of 3D models to be built with their corresponding different parameter values 1008. The parameter ranges for a virtual experiment can be specified in a tabular format. The 3D modeling engine 75 builds the 3D models and exports the virtual metrology measurement data for review (step 910). The virtual experiment mode provides output data handling from all Virtual Measurement/Metrology operations. The output data from the virtual metrology measurements may be parsed and assembled into a useful form (step 912).

With this parsing and assembling, subsequent quantitative and statistical analysis can be conducted. A separate output data collector module 110 may be used to collect 3D model data and virtual metrology measurement results from the sequence of virtual fabrication runs that comprise the virtual experiment and present them in graphical and tabular formats. FIG. 11 depicts an exemplary tabular-formatted display of virtual metrology data generated by a virtual experiment in the virtual fabrication environment. In the tabular formatted display, the virtual metrology data collected during the virtual experiment 1102 and the list of virtual fabrication runs 1104 may be displayed.

Figure 12:
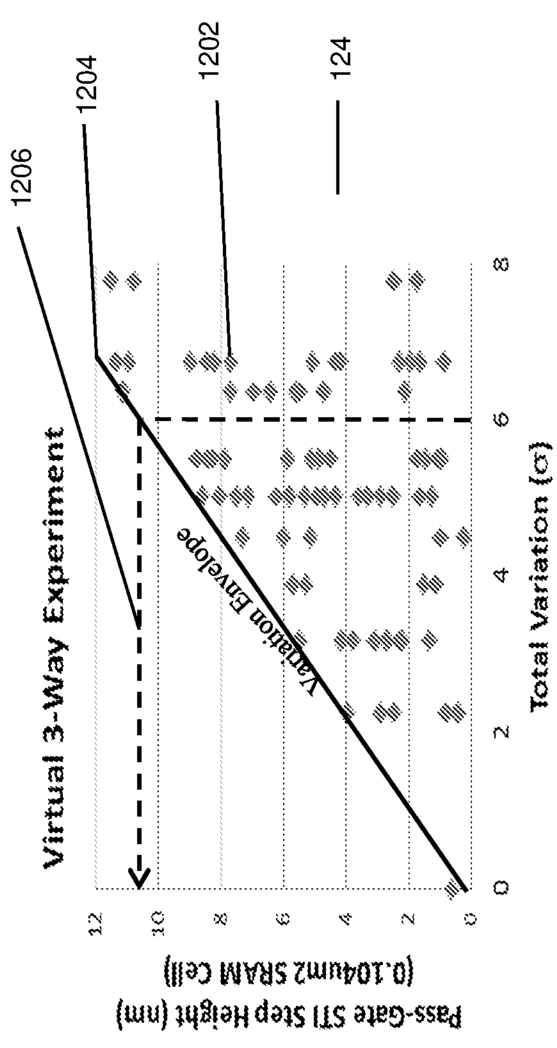
FIG. 12 depicts an exemplary graphical display of virtual metrology data generated in a virtual experiment in the virtual fabrication environment.

FIG. 12 depicts an exemplary 2D X-Y graphical plot display of virtual metrology data generated by a virtual experiment in the virtual fabrication environment. In the example depicted in FIG. 10, the total variation in shallow trench isolation (STI) step height due to varying 3 parameters in preceding steps of the process sequence is shown. Each diamond 1202 represents a virtual fabrication run. The variation envelope 1204 is also displayed as is the depicted conclusion 1206 that the downstream process modules must support approximately 10.5 nm of total variation in STI step height to achieve robustness through 6 sigma of incoming variation. The virtual experiment results can also be displayed in multi-dimensional graphic formats.

Once the results of the virtual experiment have been assembled, the user can review 3D models that have been generated in the 3D viewer (step 914*a*) and review the virtual metrology measurement data and metrics presented for each virtual fabrication run (step 914*b*). Depending on the purpose of the virtual experiment, the user can analyze the output from the 3D modeling engine for purposes of developing a process sequence that achieves a desired nominal structural model, for further calibrating process step input parameters, for optimizing a process sequence to achieve a desired process window or to determine specification limits for selected virtual metrology parameter targets.

The 3D modeling engine's 75 task of constructing multiple structural models for a range of parameter values (comprising a virtual experiment) is very compute intensive and therefore could require a very long time (many days or weeks) if performed on a single computing device. To provide the intended value of virtual fabrication, model building for a virtual experiment must occur many times faster than a physical experiment. Achieving this goal with present day computers requires exploiting any and all opportunities for parallelism. The 3D modeling engine 75 uses multiple cores and/or processors to perform individual modeling steps. In addition, the structural models for different parameter values in a set are completely independent and can therefore be built in parallel using multiple cores, multiple processors, or multiple systems.

The 3D modeling engine 75 in the virtual fabrication environment may represent the underlying structural model in the form of voxels. Voxels are essentially 3D pixels. Each voxel is a cube of the same size, and may contain one or more materials, or no materials. Those skilled in the art will recognize that the 3D modeling engine 75 may also represent the structural model in other formats. For instance, the 3D modeling engine could use a conventional NURBS-based solid modeling kernel such as is used in 3D mechanical CAD tools, although modeling operations based on a digital voxel representation are far more robust than the corresponding operations in a conventional analog solid modeling kernel. Such solid modeling kernels generally rely on a large number of heuristic rules to deal with various geometric situations, and modeling operations may fail when the heuristic rules do not properly anticipate a situation. Aspects of semiconductor structural modeling that cause problems for NURBS-based solid modeling kernels include the very thin layers produced by deposition processes and propagation of etch fronts that results in merging faces and/or fragmentation of geometry.

The virtual fabrication environment may enable the performance of a multi-etch process that is included in the process sequence which allows the 3D modeling engine 75 to model a wide-range of process and material-specific etch behavior. Patterning operations in process flows for highly scaled semiconductor devices are frequently performed using plasma etches. Plasma etches are known by many different names: dry etch, reactive ion etch (RIE), inductively coupled plasma (ICP) etch, etc. A wide variety of operating conditions and chemistry allows process engineers to fine-tune plasma etch behavior to selectively achieve diverse etch physics in multiple different classes of materials. This behavioral flexibility is key to achieving a desired 3D structure when patterning through several layers of material. Several different types of physics are typically involved, including but not limited to: chemical etching, sputtering, deposition or re-deposition of polymeric material, electrostatic charging, electrostatic focusing, and shadowing. This diverse spectrum of physics produces a commensurate range of etch behavior and hence structural shapes.

Directly simulating the physics involved in plasma etches with sufficient accuracy is extremely difficult and slow. The multi-etch process step avoids the difficulties of physics-based simulations by simulating plasma etches using a reduced set of behavioral parameters that are specific to the type of etch and the material being etched. This allows the capture of a wide range of physical etch behavior without the need to directly simulate the physics of the etch process. For example, three main types of etch behavior may be simulated: isotropic, taper, and sputtering. A fourth type of etch behavior, shadowing, can optionally also be simulated.

Basic (isotropic) behavior is caused (physically) by chemical etching and results in material being removed at a similar rate in all directions from the point on the etchable surface, regardless of the local orientation of the etchable surface. Basic behavior may be modeled with a single input parameter, "lateral ratio", that controls the ratio between the lateral and vertical etch rates. For example, a lateral ratio value of one (1.0) indicates that the etch rate is uniform in all directions. A lateral ratio value less than one indicates that the etch rate in the lateral direction (on vertical surfaces) is slower than the etch rate in the vertical direction (on horizontal surfaces).

Taper behavior is caused (physically) by a combination of directional etch behavior and polymer deposition. The polymer deposition occurs as a side effect of a directional etch process. During a directional etch process that etches horizontal surfaces much faster than vertical surfaces, polymer may accumulate on near-vertical surfaces. This competition between etching and deposition results in tapered sidewall profiles. Taper behavior may be modeled with a single input parameter, the taper angle. A taper angle describes the critical angle at which deposition and etch rates are balanced. An optional second parameter, the lateral ratio, has the same meaning as defined above for basic behavior.

Sputter behavior refers to direct physical removal of material through bombardment by energetic ions and results in preferential removal of protruding edges (convex edges) and in some cases corners. Sputtering may be modeled with two parameters: the angle of maximum sputter yield, and the rate of sputter relative to the rate of vertical etching.

Shadowing refers to a reduction in directional ion flux caused by a local elevation change, effectively reducing etch rates for some structures. This effect can be significant in some cases, resulting in differing etch rates across a cell. Shadowing may be modeled using a single parameter to describe angle of incidence of the energetic ions relative to a vertical axis.

To model a multi-material, multi-physics etch, the input parameters described above must be formed into a suitable numerical modeling algorithm in the virtual fabrication environment. The numerical modeling algorithm includes single material and multi-material speed functions and a surface evolution technique. A single-material speed function defines the etch speed as a function of local surface orientation (i.e., surface normal direction) and is determined empirically in order to produce the desired etch behavior. Note also that a single-material speed function may combine multiple types of etch behavior; for example, both taper and sputter etching include the parameters associated with basic (isotropic) etching. A multi-material speed function is a combination of single-material speed functions, and calculates the local etch speed as a function of both local surface orientation and local material type. The Etch Ratio parameter defines the relative etch rates of etchable materials and is a multiplication factor on the single-material speed.

With the speed function defined, a suitable surface evolution technique may be used to locate and evolve the position of the etchable surface in three dimensions. The etchable surface is advected or moved in its local normal direction according to the local scalar speed determined by evaluating the speed function. The scalar speed must be calculated at points of interest on the etchable surface and must be periodically re-calculated as the geometry of the etchable surface evolves.

A number of different types of surface evolution techniques may be utilized by the numerical algorithm for simulating the multi-etch process in the virtual fabrication environment. The moving surface may be represented using any suitable numerical spatial discretization. Explicit front tracking methods may be used: examples include string methods, point-and-line methods (2D) and polygon surfaces (3D). An alternate implicit surface representation, such as distance fields, volume of fluid or voxels, may also be used. Any suitable time-dependent numerical technique may be used to advance the moving surface in time.

A selective epitaxy process may be included in a process sequence used to virtually fabricate a semiconductor device structure. The selective epitaxy process virtually models epitaxial growth of a crystalline material layer on top of a crystalline substrate surface of a semiconductor device structure. Selective epitaxy is widely used in contemporary semiconductor process flows, often for the purpose of imparting mechanical stress on the transistor channel to improve performance. A key characteristic of epitaxial growth is its dependence on crystal directions. Semiconductor devices are normally fabricated on single crystal silicon wafers; i.e., silicon material with atoms arranged in a repetitive crystal lattice structure that is continuous over the majority of the wafer. Silicon crystal structure is anisotropic (i.e., not symmetric in all directions), and silicon surfaces are more stable in several particular crystal directions. These directions are defined by the major crystal plane families, identified as <100>, <110> and <111> using their Miller indices, and have the strongest impact on growth characteristics. By varying the pressure, temperature and chemical precursors in the epitaxy process, engineers can control the relative growth rates of the three major planes. Growth rates on minor planes, for example <211>, <311>, <411>, also vary but often are not influential in determining the final shape of an epitaxially grown structure.

The virtual fabrication environment may use a surface evolution algorithm to model epitaxial growth. The surface upon which epitaxial growth is occurring (the growing surface) is advected or moved according to a scalar advection speed. The growth rate is calculated at selected points based on the local surface normal direction and fixed input parameters, is local in both distance and time, and moves the surface in its normal direction. The growing surface may be represented using any suitable numerical spatial discretization. Explicit front tracking methods may be used: examples include string methods, point-and-line methods (2D) and polygon surfaces (3D). An alternate implicit surface representation, such as distance functions, volume of fluid or voxels, may also be used. Any suitable time-dependent numerical technique may be used to advance the growing surface in time.

The selective epitaxy process in the virtual fabrication environment utilizes the growth rates of the three major plane families, <100>, <110> and <111> as fixed input parameters. These input parameters define the growth rate for surfaces that are aligned with any one of their associated planes. Further input parameters may include growth rates on neighboring non-crystalline materials. The relationship between the 3D modeling coordinate system and the crystal lattice of the wafer may also be considered when calculating the epitaxial growth rate. The 3D modeling coordinate system normally uses the same X and Y axes as the 2D design data and the Z axis is normally perpendicular to the surface of the wafer. Alternate coordinate systems may also be employed. On a real wafer, the orientation of the crystal lattice is indicated by a "flat" or "notch" on the edge of the otherwise circular wafer. The notch may be used as a reference to orient the 2D design data in the desired direction relative to the crystal lattice. Input parameters specifying the notch (or flat) type and direction may define the orientation of the crystal lattice and associated crystal planes of the wafer relative to the 2D design data. It should be noted that this relationship can be described as a coordinate transformation between the 3D model coordinate system and the coordinate system of the crystal lattice.

Using the growth rates for the major plane families and knowing the orientation of the crystal lattice, the epitaxial growth rate may be calculated everywhere on the growing surface. Areas of the growing surface with a normal direction that is aligned with a major plane direction are assigned the speed of that major plane. For areas of the growing surface that are not aligned with a major plane direction, an appropriate speed must be found by interpolating between neighboring major plane directions. Further, the behavior of the epitaxial growth at the boundaries of the crystalline material can also be important. Epitaxial growth is often performed after several prior processing steps in which non-crystalline materials have been deposited and patterned. These non-crystalline materials may be adjacent to crystalline material and hence in close proximity to epitaxial growth. Examples of non-crystalline neighboring materials are silicon dioxide, silicon nitride, or any other materials common in semiconductor processing. In some cases, epitaxial growth slowly creeps along adjacent non-crystalline material (overgrowth) but in other cases it does not. Overgrowth behavior may be modeled with fixed input parameters defining the set of neighboring materials on which overgrowth occurs (overgrowth materials), as well as the speed at which the growing surface creeps along the overgrowth materials. The overgrowth speed modifies the epitaxial growth rate at the surface of the overgrowth materials such that the growing surface moves along the overgrowth material at the specified speed. In addition, the speed at which the growing surface moves along the overgrowth material may depend on the angle between the overgrowth material surface and the growing surface. The overgrowth speed may be ignored if the angle between the two surfaces is greater than a threshold angle.

Design Rule Checks (DRCs) or Optical Rule Checks (ORCs) may be performed in the virtual fabrication environment. DRCs and ORCs have typically been performed by specialized software on 2D design data as part of the process of preparing 2D design data for conversion into photolithography masks. Such checks are performed for purposes of identifying errors in the layout that would result in non-functional or poorly functioning chips. The checks are also performed after adding compensations for optical effects such as optical proximity correction (OPC). Typical design rules (as published in design manuals and coded in DRC decks) are simple 2D criteria intended to prevent problems that are fundamentally 3D in nature. However, with the growing complexity of semiconductor process technology, design manuals have blossomed into thousand-page documents with thousands of 2D design rules to codify and explain. In many cases, a single 3D failure mechanism/concern can drive hundreds of 2D design rules. The development of those 2D design rules requires significant assumptions about the 3D nature of the integrated process flow and resulting structures.

2D DRCs are developed from relatively simple calculations that may result in overly conservative designs. For example, consider the 2D design rules required to assure a minimum contact area between a line on a metal interconnect layer and an underlying via. A via is a vertical, electrically conductive connector between two interconnect layers, also called metal layers, or a vertical connector between an interconnect layer and a device such as a transistor, resistor or capacitor.

Many additional 2D DRCs are required to satisfy a criterion that is very simple to state in 3D: that the contact area between metal lines and vias must exceed a specified threshold value. The 2D DRC situation becomes even more complex when one considers that multiple manufacturing variations can affect the contact area, including over or under-exposure during lithography steps, mis-registration of the masks, planarization (via chemical mechanical polishing (CMP)) of the via layer, and the sidewall tapers produced by plasma etching. It is infeasible to include all of these statistical variations in the simple formulae that drive 2D DRCs, so the DRCs are stricter than necessary to guard against manufacturing variations. These overly strict 2D DRCs may result in sub-optimal designs with wasted area on the die.

In contrast to a 2D DRC environment, a virtual fabrication environment may perform checks, such as minimum line width, minimum space between features, and minimum area of contacts, directly in 3D without making assumptions about the translation from 2D to 3D. Checks performed directly in 3D are referred to herein as "3D DRCs". One benefit of 3D DRC is that the required number of checks is significantly smaller than the number required in 2D environments. As a result, the checks are more robust and easier to develop than 2D checks. Furthermore, with a much smaller set of 3D rules, the virtual fabrication environment can perform the checks for a range of statistical variations in process parameters.

It should be appreciated that 3D-DRCs are distinct from virtual measurement/metrology operations that may also be performed in the virtual fabrication environment. The virtual measurement metrology operations mimic actual measurement and metrology operations in the fab, whereby a measurement location is specified and a metric such as a distance value or area is output. For 3D DRCs, on the other hand, a geometric criterion is specified and the location and value of the criterion are desired. That is, the location is an output of the 3D DRC operation rather than an input. For example, a virtual metrology operation may specify an oxide film thickness measurement at a specific location indicated by a locator in the 2D design data, whereas a 3D DRC for minimum layer thickness may request the location(s) anywhere in the 3D model where the oxide film thickness is less than a specified threshold value. The 3D structural model may then be searched for locations where the specified minimum dimensional criteria are satisfied. Similarly, a 3D DRC may also cause the structural model to be searched to see if a maximum dimensional criterion is satisfied. 3D DRCs of this type thus provide benefits unavailable with virtual measurement/metrology operations for identifying unexpected causes of failures.

Examples of 3D-DRCs include:

Electrical Net Isolation: finds the shortest distance between selected conductors. A conductor is a lump that may be comprised of one or more conducting materials (a "lump" is a discrete volumetric region (technically, a 3-manifold) within a 3D structural model. A lump may be composed of a single material or multiple materials);

Minimum Separation: finds the shortest distance between any pair in a group of selected lumps;

Minimum Line Width, finds the shortest distance through any lump in a group of selected lumps;

Minimum Layer Thickness, finds the shortest distance through any lump in the collection of lumps that comprise a layer of material;

Minimum Contact Area: finds the smallest contact area between all pairs of selected lumps.

Lumps may be selected on the basis of constituent material(s), electrical conductivity or other properties. Each of the 3D DRC checks can be extended by specifying a threshold value. For example, specifying a threshold value for a Minimum Line Width check produces a list of locations where the minimum line width is less than the threshold value. Those skilled in the art will recognize that other checks of this nature may be defined.

Analytics Module

In one embodiment, the virtual fabrication environment includes an analytics module. The analytics module is designed to mimic the workflows in use cases encountered by semiconductor process integrators. Exemplary use cases encountered by semiconductor process integrators and addressed by the analytics module may include but are not limited to, key parameter identification, process model calibration, variability analysis, process window optimization and the determination of specification limits from virtual metrology data. In key parameter identification, the analytics module may find process steps/parameters that most strongly influence an outcome (calibration, defect mode, etc.). In process model calibration, the process parameters may be adjusted to make the 3D model match measurements from a physical fab, such as, but not limited to, Transmission Electron Microscopy (TEM) data or a process target. In variability analysis, the analytics module may assist the user in analyzing and understanding the variability in metrology data obtained for a set of virtual 3D models such as by, but not limited to, estimating variability in structural or electrical parameters for specification limit setting. In process window optimization, the analytics module may analyze and display information in the virtual fabrication environment to help a user understand the sensitivity of the yield of the POR to parameter nominal values and window sizes and to assist the user in assessing yield improvement scenarios when adjusting parameter nominals and allowed ranges, starting from the POR. The determination of specification limits from virtual metrology data is discussed further below.

In one embodiment, the analytics module is integrated into the virtual fabrication environment resulting in improved and new functionality not available via third party statistical solutions. In an embodiment, the UI and algorithms may be organized by use cases and follow a left-side UI, step-wise flow for each use case. This design may strongly guide the user (who may lack statistical training) to perform correct analysis steps so that they avoid mistakes in the analysis. The analytics module may also include a statistical analysis engine that employs a set of analysis algorithms to correctly analyze each specific use case. Results of the analysis may be provided and/or displayed to a user or to third party software in a number of formats.

Inputs to the analytics module may include, but are not limited to, selection of the type of analysis, which may be organized by use case (e.g., identifying key parameters, optimization, calibration, variability analysis, process window optimization, etc.). Additional exemplary inputs may include process parameters of interest (e.g., specified as nominal values and/or ranges) and targets of interest (e.g., metrology values, structure searches, DTC checks, electrical analysis values). In one embodiment, an input value may be a reference to a 3D model file. In some embodiments, the analytics module may perform run list generation to set up an experimental Design of Experiments (DOE) (e.g., a screening D.O.E., a full factorial D.O.E., a Monte Carlo simulation) followed by run list execution and may utilize cluster computing to increase efficiency during execution. Outputs from execution may include outlier detection and statistical analysis results such as determining parameter significance/ranking. Outputs may also include exploratory graphs (e.g., bivariate plots, response surface) and indirect optimization. In one embodiment results may also be exported to third party tools for further analysis.

D.O.E. is a methodology for calculating the number of experiments at specific combinations of parameters settings such that more information is gained for less experimental effort. Monte Carlo simulation is a D.O.E. option that allows for random generation of parameter settings using normal or uniform distributions. In an embodiment, the UI allows the user to input means and standard deviations for normally distributed parameters, or minima and maxima for uniformly distributed parameters, and random values are generated accordingly. As a parameter for the D.O.E., the user may also enter the number of virtual fabrication runs desired.

Specification Limit Determination Using NGF Algorithm

Virtual metrology data generated from virtual fabrication runs in some virtual fabrication environments may be Gaussian or non-Gaussian in distribution because of the voxel-based representations used in representing the 3D models produced in the virtual fabrication environment. However, the non-Gaussian data is not correctly described by the customary Gaussian mean and sigma limits and therefore specification limits (the allowable ranges of measurements for virtual metrology targets) estimated from virtual metrology data using Gaussian fitting methods are frequently incorrect in those cases. Embodiments of the present invention provide a Non-Gaussian Fitting (NGF) algorithm that enables an engineer or other user using analytics software in the virtual fabrication environment to estimate extremes and sigma equivalent cutoffs for data that is not normally distributed. Thus, the engineer or other user of the virtual fabrication environment can better understand the distribution of the virtual metrology data and set correct specification limits for target parameters.

Virtual fabrication environments that use internal data representations based on voxels produce virtual metrology data having different types of distributions. These distributions can range from a Gaussian distribution (visualized as a traditional bell curve) to highly non-Gaussian distributions (very discretized, asymmetric, and clumped). A 3D model resolution selected for the virtual fabrication of a semiconductor device in a virtual fabrication environment affects, but does not fully control, the extent of the non-Gaussian behavior.

Figure 13:
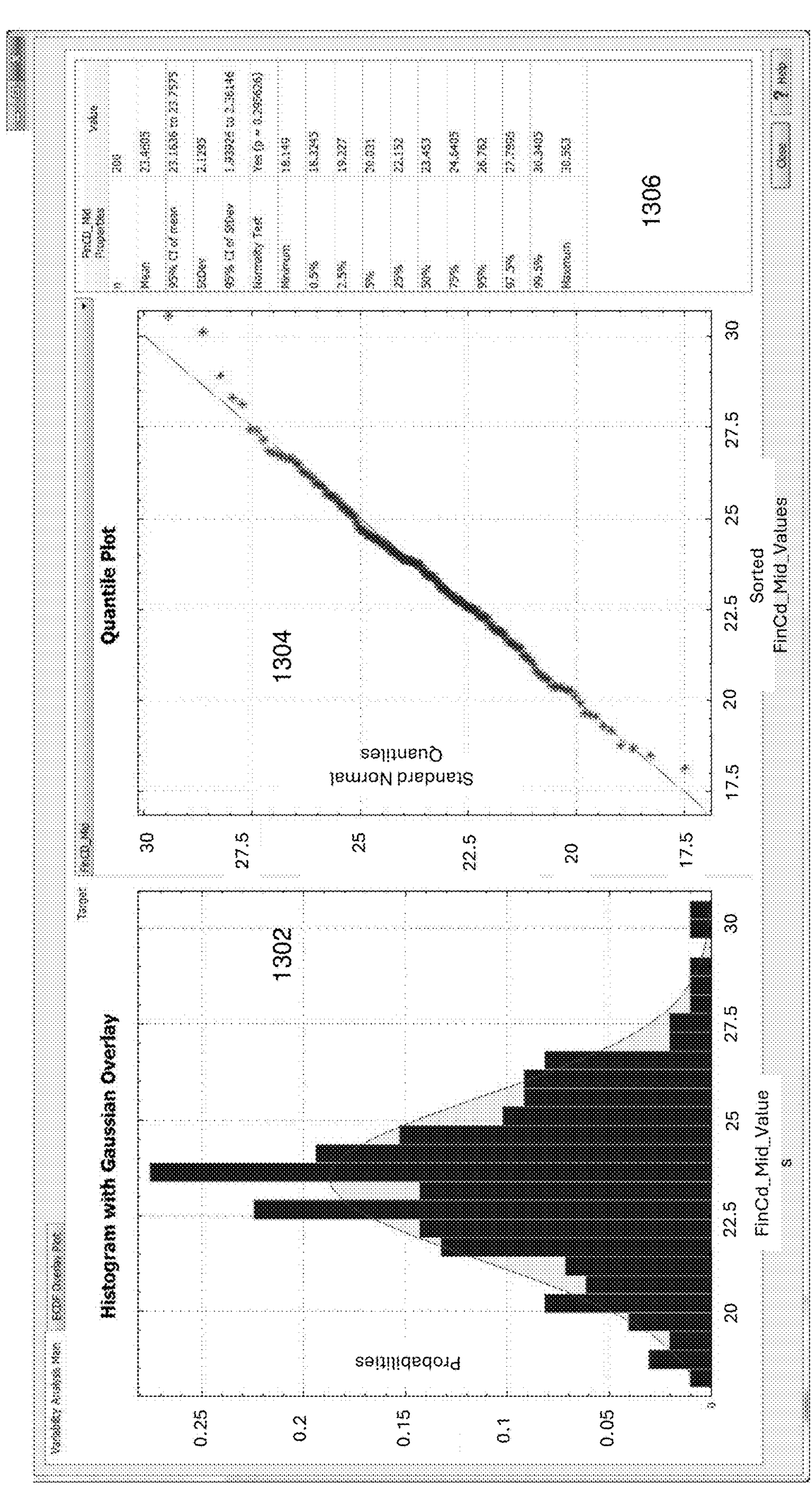
FIG. 13 depicts exemplary output from tests in a virtual fabrication environment to determine whether virtual metrology data follows a Gaussian (normal) distribution.

Some virtual fabrication environments currently implement tests to determine whether virtual metrology data follows a Gaussian (normal) distribution. Exemplary tests include a Gaussian probability density function (pdf) overlay on a data histogram, a quantile-quantile plot, and a Lilliefors Test. For example, the data depicted in FIG. 13, which relates to a FinCD_mid metrology target, is (mostly) Gaussian distributed according to the three tests. FIG. 13 depicts a Gaussian pdf overlay on a data histogram 1302. The data is symmetric and hill-shaped like a Gaussian distribution, and contains a small amount of discretization (186 values are unique out of 200). Also shown is a quantile-quantile plot 1304 which shows the extent of normality and a chart 1306 showing other relevant information. The table depicted in chart 1306 summarizes important information regarding the statistical behavior of the selected metrology (in this case: FinCD_Mid). For example, it begins with the sample data size (n), then estimated mean and standard deviation along with their confidence intervals and also shows how well the metrology data can be described as normal distribution by giving p-value of a normality test (the higher the value the more strongly the data can be described as a normal distribution). Subsequently, chart 1306 also makes note of metrology values at certain specific sigma values corresponding to percentages starting from 0.5% to 99.5%. When the distribution tests indicate that the virtual metrology data distribution is Gaussian, then the mean and standard deviation can be used to describe the data and to set ±1, ±2, ±3, ±4 sigma specification limits.

However, if the virtual metrology data produced by the virtual fabrication environment is distributed in a non-Gaussian fashion according to the results of the applied tests, the engineer or other user of the virtual fabrication environment is conventionally faced with a problem. While some virtual fabrication environments may produce a table of percentiles of the non-Gaussian distributed data that is somewhat helpful, such a table cannot be used to make accurate estimates of the outer limits of the data (±3 or ±4 sigma, maximum/minimum).

Figure 14:
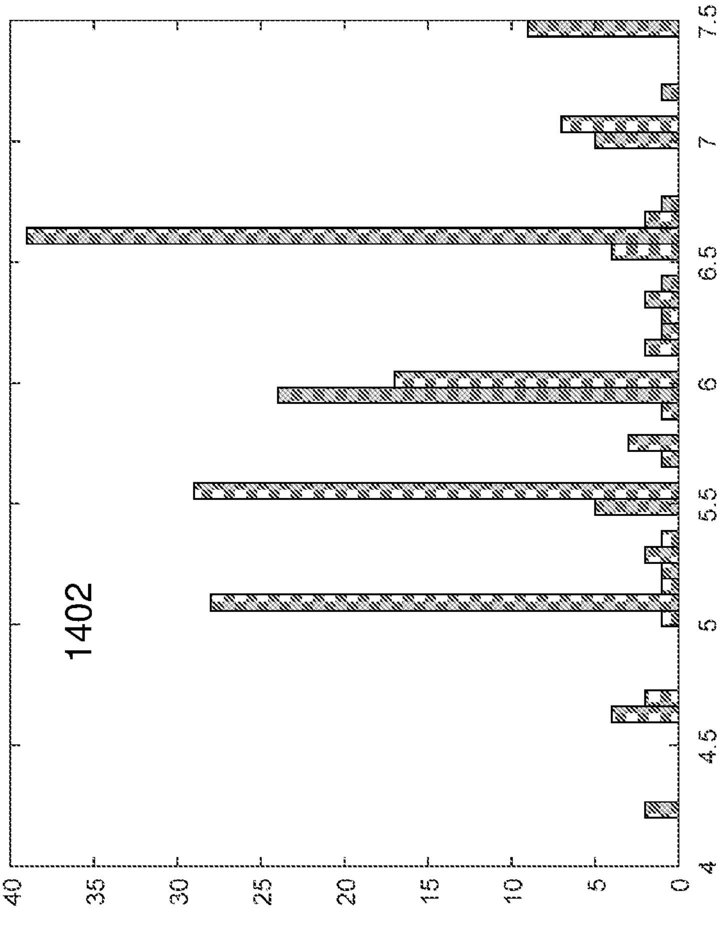
FIG. 14 depicts a histogram of a dataset that is non-Gaussian is distribution.

To more fully explain this problem, FIG. 14 depicts an example of histograms of a sidewall data set 1402 of virtual metrology measurements produced by a virtual fabrication environment that is highly non-Gaussian in distribution. The data set has some discretization (only 154 unique values out of 197), is asymmetric (with a long tail at lower values and a short tail at higher values), and has clear clumps of data values. Conventional algorithms that assume a normal distribution and attempt to analyze this type of data provide inaccurate results. For example, some algorithms that are used conventionally for data analysis include a Gaussian Mixture Model that fits multiple weighted Gaussian densities to the data, Kernel Smoothing that fits a kernel density other than Gaussian to the data, and Pareto Tails that fits an empirical cumulative distribution function (ECDF) to only the middle of the data and uses the long-tailed Pareto distribution to fit the extremes of the data. These conventional algorithms either produce poor fits to the sidewall or fail to converge because of their underlying assumptions. More particularly, the algorithms assume the data is continuous (not discretized) and that the data distribution is effectively the result of adding together values from multiple, continuous, known distributions. For example, GMM adds together multiple weighted Gaussians, KS adds together multiple weighted non-Gaussian kernels, and the Pareto Tail method assumes the tails of the data distribution follow a Pareto distribution.

Unfortunately, virtual metrology data for 3D models based on a voxel-based representation do not necessarily follow any known distribution. Most importantly, because of their assumptions, all these methods do not give good estimates of the behavior of the outer limits of the data (±3 or ±4 sigma, maximum/minimum) which are of the greatest interest to an engineer. It should be appreciated that being able to determine additional information at the outer limits of the metrology data gives a user an opportunity to relax process parameter ranges that are of concern. The additional information allows a user to achieve robust recipes (the specific combination and values of parameters for pressure, power, current frequency, etc. that must be adjusted to achieve certain desired structures on the wafer) more precisely where control over a tool's precision is difficult to achieve or process parameter ranges are very tight.

Embodiments of the present invention provide a non-parametric approach that utilizes a non-Gaussian fitting (NGF) algorithm within a virtual fabrication environment that handles non-Gaussian data without making any assumptions about the distribution of the data. For instance, such algorithms may use empirical distributions and use analytics of the empirical distributions to estimate the extremes.

Figure 15:
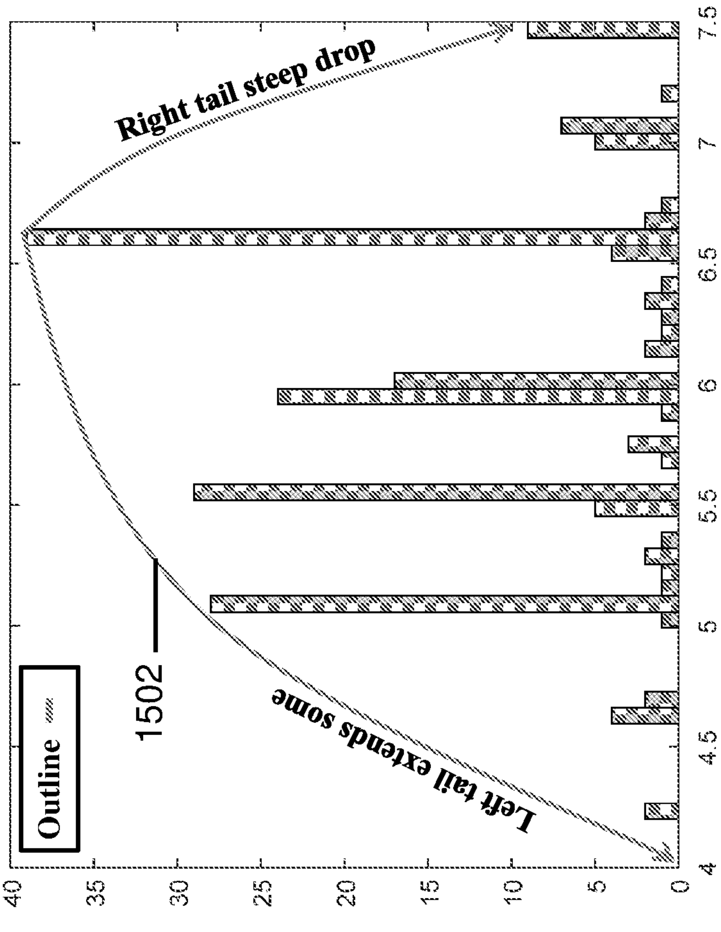
FIG. 15 depicts a histogram of the sidewall data of FIG. 14 with an encompassing outline of the data.

The histograms of non-Gaussian distributed data can provide a suggestion of population extremes. FIG. 15 shows a histogram of the sidewall data of FIG. 14 with an encompassing outline 1502 of the data. The ends of the outline 1502 suggest reasonable estimates for population extremes. More particularly, the right tail/upper limit shows a steep drop while the left tail/lower limit suggests a more gradual decline. The NGF algorithm described in this example uses an empirical distribution called an Empirical Cumulative Distribution Function (ECDF) for the virtual metrology data. For instance, it is observed that analytics such as confidence bounds can be computed for such an ECDF, and that those confidence bounds exhibit similar behavior to encompassing outlines whose extensions suggest reasonable estimates of target parameter extremes.

In an embodiment, the confidence intervals for each ECDF may be calculated according to the following expression (also known as the Greenwood Formula):

$$CI(Z(t)) = Z(t) \pm \left(\sqrt{\widehat{Var}(Z(t))}\right)_{Z\alpha/2}$$

CI(Z(t))=Confidence interval at Z(t)

Z(t)=Each point on the Empirical Cumulative Density Function (ECDF)

$\widehat{Var}$ (Z(t))=Estimated Variance at Z(t) calculated with a confidence rate (%)

$$\widehat{Var}(\hat{S}(t)) = [\hat{S}(t)]^2 \times \left[\sum_r \frac{1}{(n-r)(n-r+1)}\right]$$

$$\hat{S}(t) = \prod_{t_r \leq t} \left(\frac{n-r}{n-r+1}\right)$$

n=Total observations (total unique values in ecdf)

r=Number of occurrences of each value (for non-unique values more than one)

Ŝ(t)=Kaplan-Meier Estimator

Figure 16:
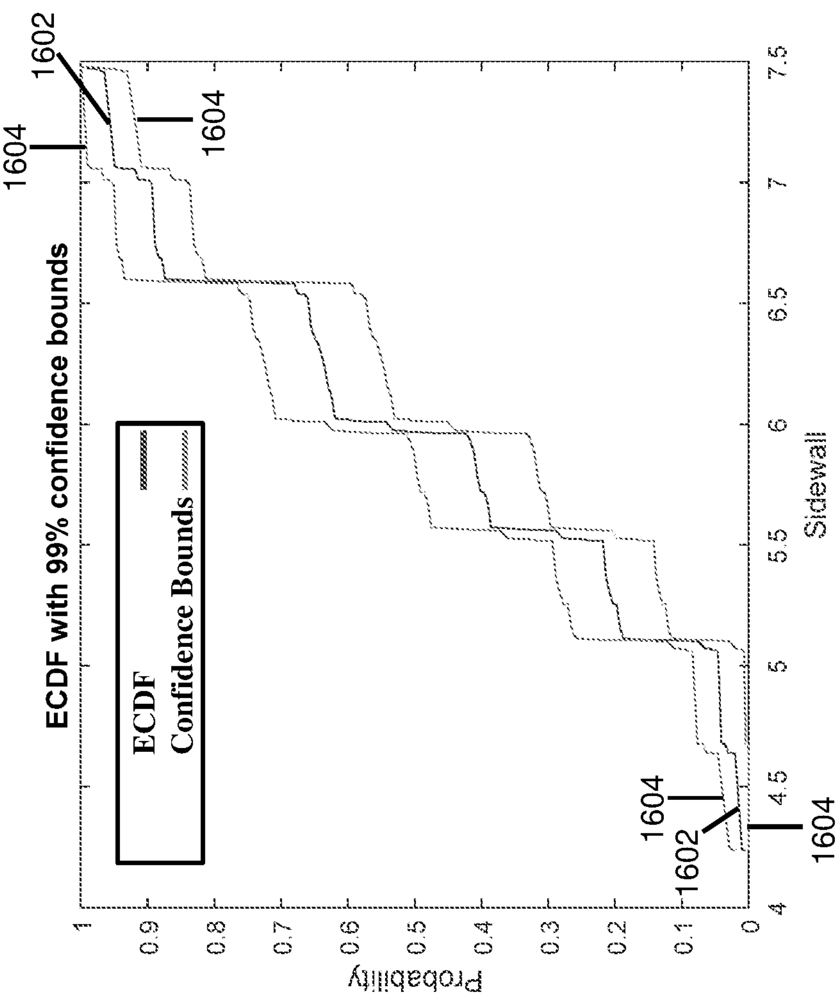
FIG. 16 depicts a plot of an ECDF for the sidewall data of FIG. 14 with 99% confidence bounds.

For example, FIG. 16 shows a plot of the ECDF 1602 for the sidewall data of FIG. 14 with 99% confidence bounds 1604. On the right tail, the lower confidence bound moves upward steeply. On the left tail, the upper confidence bound gradually moves downward. This is similar to the pattern that occurs in the outlined histogram depicted in FIG. 15 where the right tail has a steep drop, while the left tail extends some. In one embodiment, the confidence bounds 1604 at the tails of the plotted ECDF 1602 are extrapolated 1702 using linear regression, as shown notionally in FIG. 17. The ±3 or ±4 sigma points and maximal/minimal extremes (or another value in the tails) can be estimated using the linear regression model. It should be noted that for the median, ±1 sigma, and ±2 sigma points on a non-Gaussian distribution, linear interpolation that uses the raw data or the ECDF may still provide useful answers, provided the number of data points is reasonably large (200+). However, there is generally more interest in the behavior of the outer limits of the data (±3 or ±4 sigma and maximal/minimal extremes). In further embodiments, other forms of a predictive model could be used for the extension, e.g., quadratic or spline regressions instead of the linear regression model.

In one embodiment the NGF algorithm performs the following sequence to predict ±3 sigma specification limits:

1. Compute 99% confidence bounds for each data point on the ECDF for the target parameter.

2. For the right tail:

a. Determine which sets of confidence bounds on the right tail contain the upper +3 sigma probability (0.99865).

b. Take the lower confidence bounds in those sets and use them as the independent variable (ignoring NaNs). The actual data values in that set become the dependent variable.

c. Calculate a linear regression with bias value.

d. Predict data values corresponding to chosen input probabilities, e.g., the estimated +3 sigma is predicted from an input of 0.99865 as the independent variable. The estimated population maxima is calculated from an input of 1.

3. For the left tail
  a. Determine which sets of confidence bounds on the left tail contain the lower −3 sigma probability (0.0013499).
  b. Take the upper confidence bounds in those sets and use them as the independent variable (ignoring NaNs). The actual data values in that set become the dependent variable.
  c. Calculate a linear regression with bias value.
  d. Predict data values corresponding to chosen input probabilities, e.g., the estimated population −3 sigma is predicted from an input of 0.0013499 as the independent variable. The estimated population minima is calculated from an input of 0.

Figure 18:
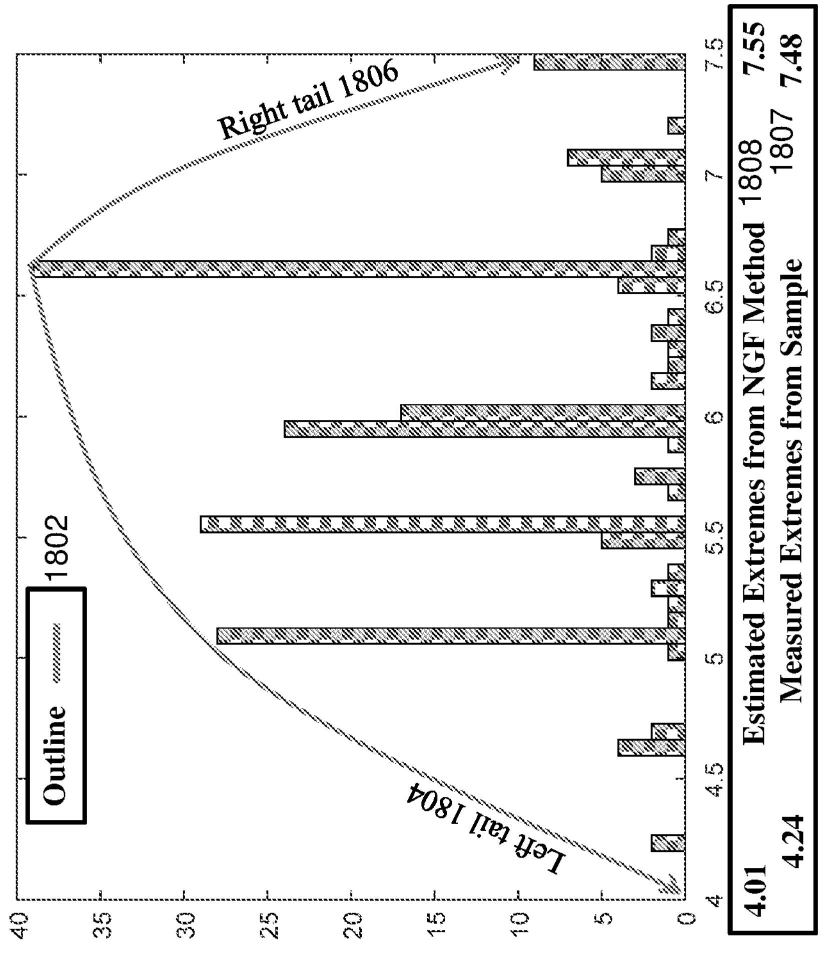
FIG. 18 depicts an example result from application of an NGF algorithm for the sidewall data set of FIG. 14 in an exemplary embodiment.

An example result from application of the NGF algorithm for the sidewall data set of FIG. 14 is shown in FIG. 18 in an exemplary embodiment. The minimum and maximum 1807 values in the measured data samples are 4.24 and 7.48, respectively. The encompassing outline suggests the left tail 1804 should extend further, and the right tail 1806 should extend only slightly. The estimated extremes 1808 from NGF are 4.01 and 7.55, which match the visual expectation when plotted. FIG. 18 also depicts a table 1810 with all the points on the distribution (median, ±1, ±2, ±3, estimated extremes) computed by the analytics module in the virtual fabrication environment.

In another embodiment, different alpha levels (see Greenwood Formula, above) for the confidence bounds may be chosen either as a programmatic default or through a user supplied input via a provided user interface in the virtual fabrication environment. Alpha values control the acceptable percentage of failing to predict the certain quantity correctly. For example, if an alpha value is kept at 5% percent, that would mean that out of 100 predictions it is acceptable to predict 5 incorrectly.

In exemplary embodiments, use of the NGF algorithm thus provides a non-parametric approach in the way the algorithm fits the tails of the data regardless of whether the tail distribution follows a known, defined distribution. Instead of attempting to force a fixed distribution to a tail as is the case with conventional approaches, the NGF algorithm uses the confidence bounds on an ECDF as a way to fit the tail shape of a data distribution.

Figure 19:
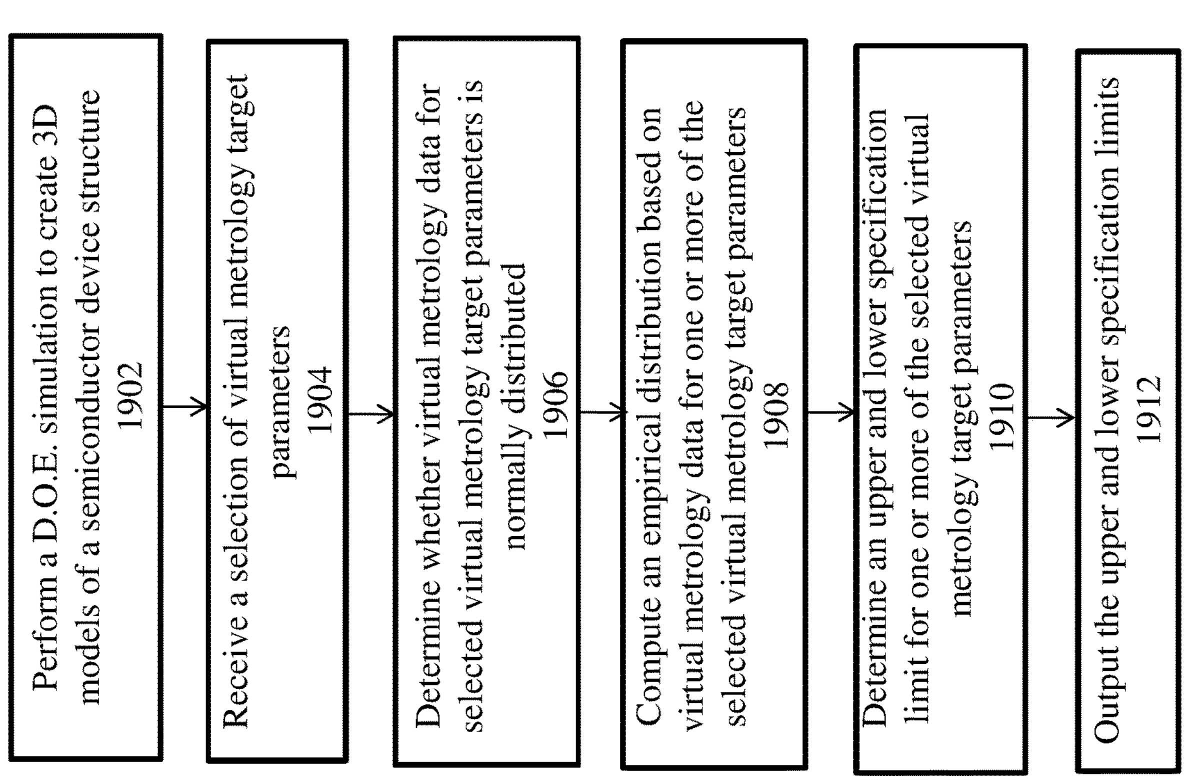
FIG. 19 depicts a sequence of steps used to determine specification limits using a non-Gaussian fitting algorithm in an exemplary embodiment.

FIG. 19 depicts a sequence of steps used to determine specification limits using an NGF algorithm in an exemplary embodiment. The sequence begins with a D.O.E. simulation being performed in the virtual fabrication environment to create 3D models of a semiconductor device structure (step 1902). The virtual fabrication environment receives a selection of virtual metrology target parameters (step 1904). A determination is made whether virtual metrology data for the selected virtual metrology target parameters follows a normal distribution (i.e., whether the virtual metrology data is distributed in a normal or non-normal fashion) (step 1906). In one embodiment, the determination of the normality of the distribution of the virtual metrology data for the selected virtual metrology target parameters is programmatically made by the analytics module. In another embodiment, the analytics module provides the data to the user via a graphical user interface and the user determines and indicates the lack of a normal distribution via the graphical user interface after analyzing the data. When the virtual metrology data is not distributed in a normal fashion, the analytics module computes an empirical distribution based on virtual metrology data for one or more of the selected virtual metrology target parameters (step 1908). The NGF algorithm may be used to determine an upper and lower specification limit for one or more selected virtual metrology target parameters (step 1910). The determined upper and lower specification limits may then be output (step 1912). For example, the determined upper and lower specification limits may be displayed to the user via a provided graphical user interface or exported for storage or further analysis.

Figure 20:
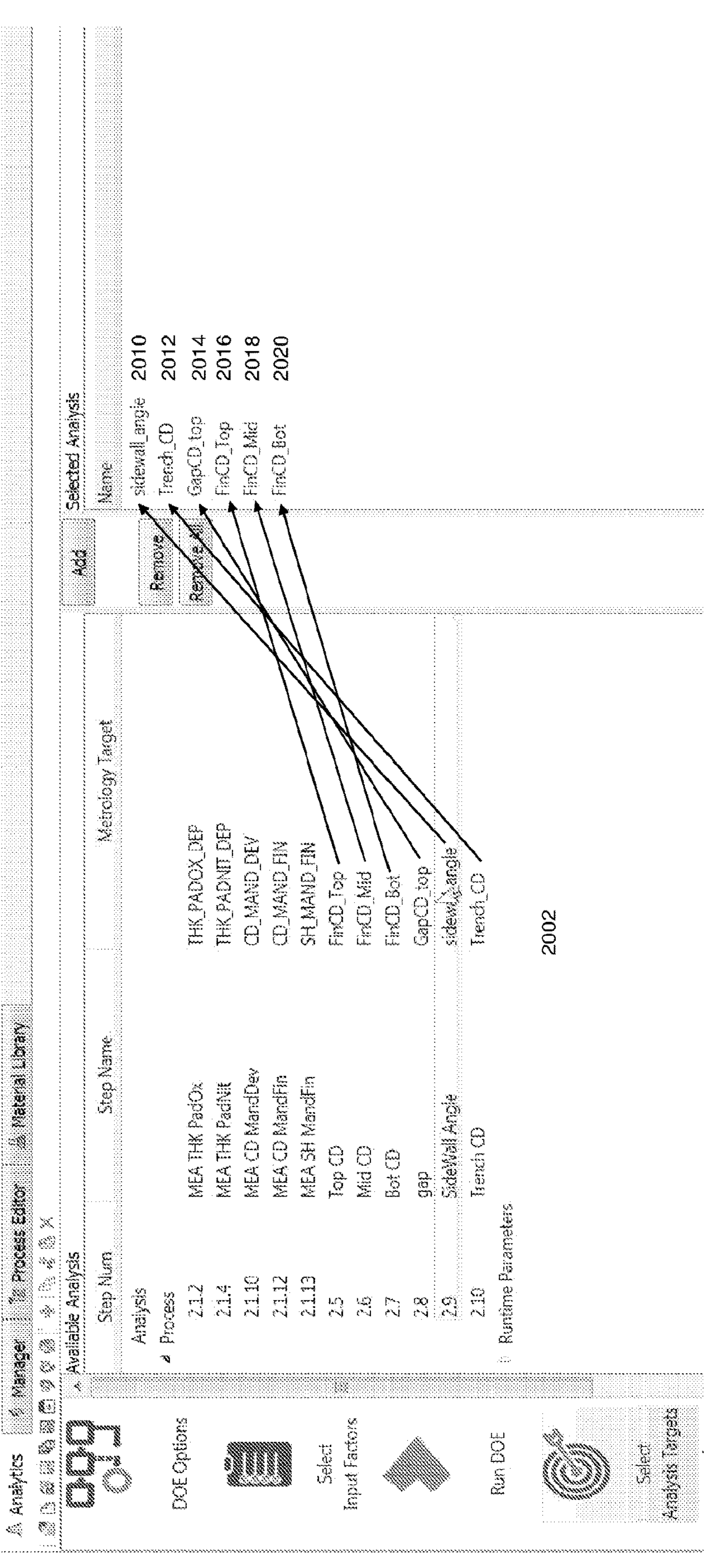
FIG. 20 depicts a graphical user interface provided by a virtual fabrication environment in an exemplary embodiment that enables the selection of virtual metrology targets.

In one embodiment, the virtual fabrication environment provides a graphical user interface that enables the user to enter options for a DOE. After running the DOE, the virtual fabrication environment may provide a graphical user interface that enables a user to select target parameters for the virtual metrology data produced by the virtual fabrication runs in the DOE. For example, FIG. 20 depicts a graphical user interface 2002 provided by a virtual fabrication environment in an exemplary embodiment that enables the selection of virtual metrology targets associated with respective process steps in the process sequence being executed during the virtual fabrication runs. As depicted, target parameters sidewall angle 2010, Trench_CD 2012, GapCD_Top 2014, FinCD_Top 2016, FinCD_Mid 2018 and FinCD_Bot 2020 have been selected for analysis. The graphical user interface may enable a normality test for the selected parameters to be conducted (see exemplary results in FIG. 13). If the results of the normality test indicate that the data does not fit a normal distribution, the analytics module may then use the NGF algorithm to estimate extremes from confidence bounds for computed ECDFs of the virtual metrology data for the selected target parameter.

Figure 17:
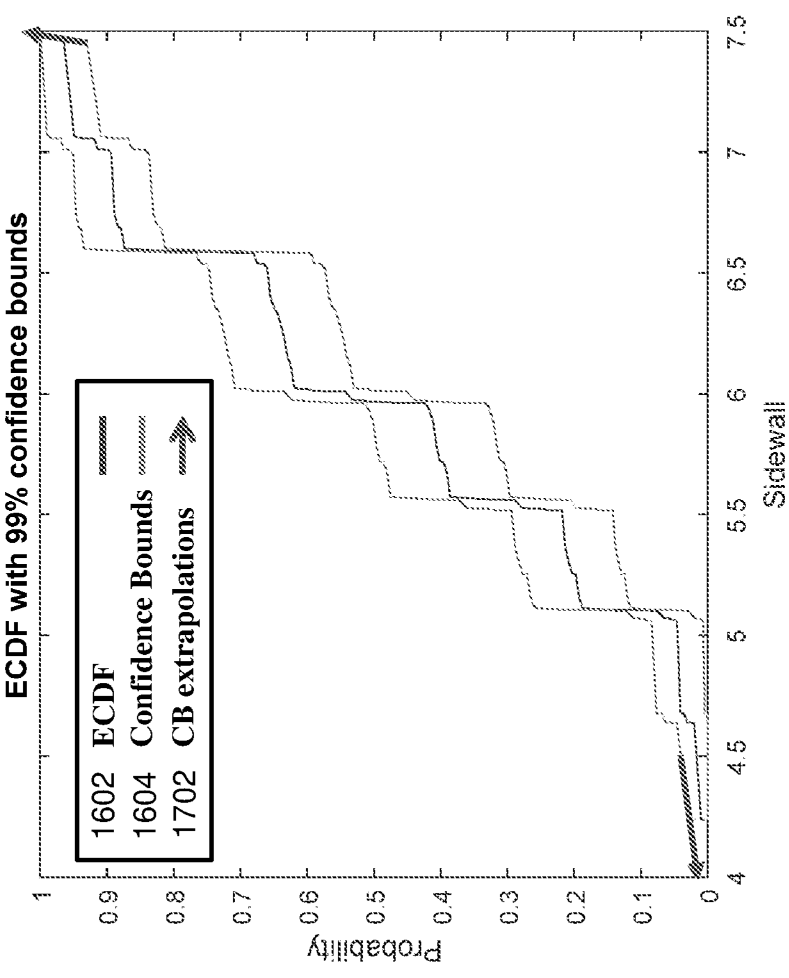
FIG. 17 depicts an extrapolation of confidence bounds using linear regression in an exemplary embodiment.
Figure 21:
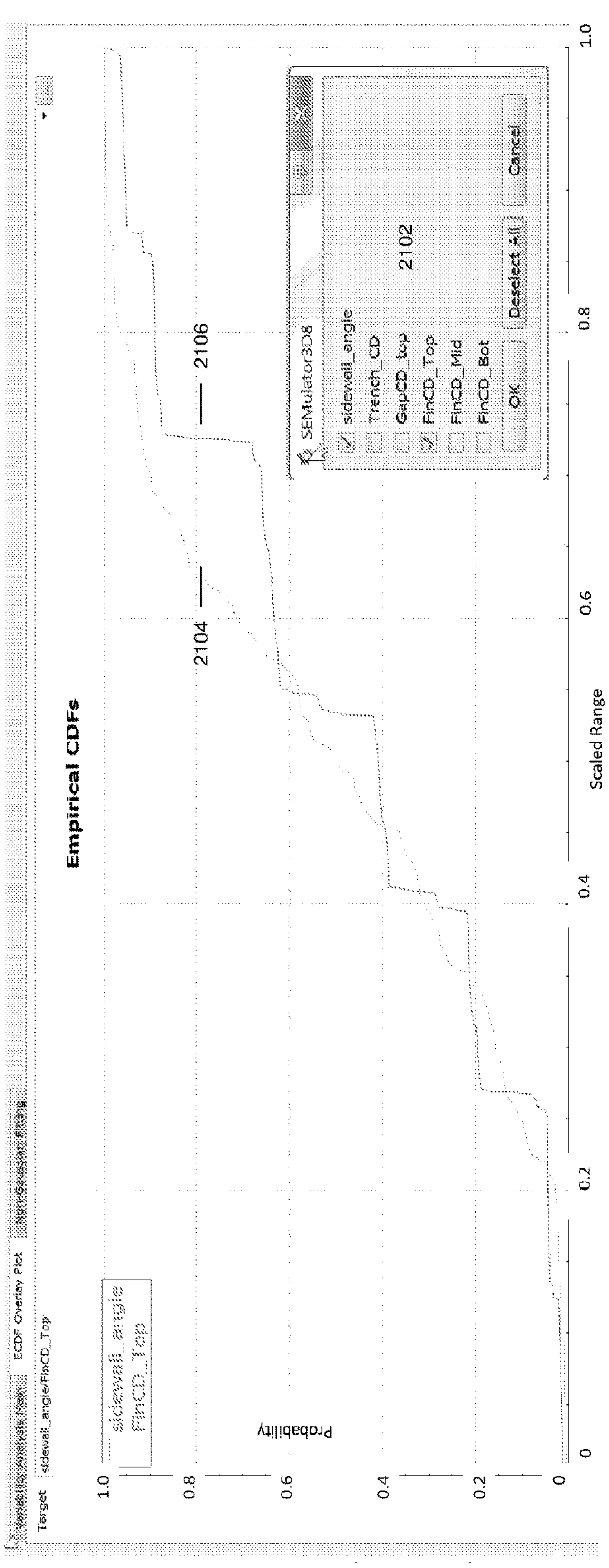
FIG. 21 depicts a graphical user interface in an exemplary embodiment that enables a user to select multiple target parameters in order to display plots of the associated ECDFs at the same time.

FIG. 21 depicts a graphical user interface in an exemplary embodiment that enables a user to select multiple target parameters in order to display plots of the associated ECDFs at the same time. For example, a selectable list 2102 may be provided by the virtual fabrication environment that enables a user to select multiple target parameters. As depicted, plots of ECDFs for FinCD_Top 2104 and sidewall_angle 2106 are displayed. As previously discussed confidence bounds for each ECDF may be calculated and used by the NGF algorithm to estimate min/max extremes as depicted in FIG. 17.

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A non-transitory computer-readable medium holding computing device-executable instructions, the instructions when executed causing at least one computing device equipped with one or more processors to:

perform a Design of Experiments (DOE) simulation for a semiconductor device structure, the simulation including a plurality of virtual fabrication runs, the plurality of virtual fabrication runs building a plurality of 3D models of the semiconductor device structure;

receive a selection of one or more virtual metrology target parameters;

determine whether virtual metrology data for the selected virtual metrology target parameters is normally distributed;

compute an empirical distribution based on the virtual metrology data for one or more of the selected virtual metrology target parameters;

determine confidence bounds for points in the empirical distribution for the one or more of the selected virtual metrology target parameters;

determine an upper and lower specification limits for one or more of the selected virtual metrology target parameters based on the respective confidence bounds; and output the upper and lower specification limits.

2. The medium of claim 1, wherein the instructions when executed further cause the at least one computing device to:

extrapolate, using one or more regression models, from the confidence bounds, the upper and lower specification limits.

3. The medium of claim 2 wherein the one or more regression models include a linear regression model.

4. The medium of claim 2 wherein the one or more regression models include a spline regression model.

5. The medium of claim 1, wherein the instructions when executed further cause the at least one computing device to:

output the upper and lower specification limits as export data.

6. The medium of claim 1, wherein the instructions when executed further cause the at least one computing device to:

output the upper and lower specification limits on a graphical user interface.

7. The medium of claim 1, wherein the instructions when executed further cause the at least one computing device to:

identify a first set of confidence bounds that contain a selected positive sigma probability;

identify a second set of confidence bounds that contain a selected negative sigma probability;

perform a first regression using the first set of confidence bounds to determine an upper specification limit for the target parameter; and perform a second regression using the second set of confidence bounds to determine a lower specification limit for the target parameter.

8. The medium of claim 7 wherein the first regression uses the lower confidence bound in the first set of confidence bounds as an independent variable and the second regression uses the upper confidence bound in the second set of confidence bounds as an independent variable.

9. The medium of claim 1 wherein the instructions when executed further cause the at least one computing device to:

output analysis of the virtual metrology data for the selected virtual metrology target parameters; and receive user input indicating that the virtual metrology data for the selected virtual metrology target parameters fails to follow a normal distribution.

10. The medium of claim 1, wherein the upper or lower specification limit is at least one of a standard deviation value or an extremum.

11. The medium of claim 1, wherein at least one set of confidence bounds is computed with an alpha value of at least 0.99.

12. The medium of claim 1 wherein the instructions when executed further cause the at least one computing device to:

plot the empirical distribution and confidence bounds for the one or more selected virtual metrology target parameters; and display the plots on a graphical user interface.

13. A computing device-implemented method, the computing device including one or more processors, the method comprising:

performing a Design of Experiments (DOE) simulation for a semiconductor device structure, the simulation including a plurality of virtual fabrication runs, the plurality of virtual fabrication runs building a plurality of 3D models of the semiconductor device structure;

receiving a selection of one or more virtual metrology target parameters;

determining whether virtual metrology data for the selected virtual metrology target parameters is normally distributed;

computing an empirical distribution based on the virtual metrology data for one or more of the selected virtual metrology target parameters;

determining confidence bounds for points in the empirical distribution for the one or more of the selected virtual metrology target parameters;

determining an upper and lower specification limits for one or more of the selected virtual metrology target parameters based on the respective confidence bounds; and outputting the upper and lower specification limits.

14. The method of claim 13, further comprising:

extrapolating, using one or more regression models, from the confidence bounds, the upper and lower specification limits.

15. The method of claim 14 wherein the one or more regression models include a linear regression model.

16. The method of claim 14 wherein the one or more regression models include a spline regression model.

17. The method of claim 13, further comprising:

outputting the upper and lower specification limits as export data.

18. The method of claim 13, further comprising:

outputting the upper and lower specification limits on a graphical user interface.

19. The method of claim 13, further comprising:

identifying a first set of confidence bounds that contain a selected positive sigma probability;

identifying a second set of confidence bounds that contain a selected negative sigma probability;

performing a first regression using the first set of confidence bounds to determine an upper specification limit for the target parameter; and performing a second regression using the second set of confidence bounds to determine a lower specification limit for the target parameter.

20. The method of claim 19 wherein the first regression uses the lower confidence bound in the first set of confidence bounds as an independent variable and the second regression uses the upper confidence bound in the second set of confidence bounds as an independent variable.

21. The method of claim 13, further comprising:

outputting analysis of the virtual metrology data for the selected virtual metrology target parameters; and receiving user input indicating that the virtual metrology data for the selected virtual metrology target parameters fails to follow a normal distribution.

22. The method of claim 13, wherein the upper or lower specification limit is at least one of a standard deviation value or an extremum.

23. The method of claim 13, wherein at least one set of confidence bounds is computed with an alpha value of at least 0.99.

24. The method of claim 13 further comprising:

plotting the empirical distribution and confidence bounds for the one or more selected virtual metrology target parameters; and displaying the plots on a graphical user interface.

25. A system, comprising:

at least one computing device equipped with one or more processors and configured to generate a virtual fabrication environment that is configured to:

perform a Design of Experiments (DOE) simulation for a semiconductor device structure, the simulation including a plurality of virtual fabrication runs, the plurality of virtual fabrication runs building a plurality of 3D models of the semiconductor device structure, receive a selection of one or more virtual metrology target parameters, determine whether virtual metrology data for the selected virtual metrology target parameters is normally distributed, compute an empirical distribution based on the virtual metrology data for one or more of the selected virtual metrology target parameters, determine confidence bounds for points in the empirical distribution for the one or more of the selected virtual metrology parameters;

determine an upper and lower specification limits for one or more of the selected virtual metrology target parameters based on the respective confidence bounds, and output the upper and lower specification limits; and a display surface in communication with the at least one computing device, the display surface configured to display data generated in the virtual fabrication environment.

* * * * *